(12) United States Patent
Ogawa et al.

(10) Patent No.: US 6,400,661 B1
(45) Date of Patent: Jun. 4, 2002

(54) OPTICAL RECORDING MEDIUM REPRODUCING APPARATUS

(75) Inventors: Hiroshi Ogawa; Shinichiro Iimura, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/669,442

(22) Filed: Sep. 25, 2000

Related U.S. Application Data

(62) Division of application No. 09/217,695, filed on Dec. 21, 1998, now Pat. No. 6,167,007, which is a division of application No. 08/716,266, filed on Sep. 24, 1996, now Pat. No. 6,034,936.

(30) Foreign Application Priority Data

Jan. 31, 1995 (JP) ............................................. 7-036101
Jan. 31, 1996 (WO) ................. PCT/JP96/00177

(51) Int. Cl.$^7$ ............................................. G11B 7/00
(52) U.S. Cl. ............................... 369/44.27; 369/44.26; 369/44.29; 369/53.22; 369/53.28
(58) Field of Search ........................ 369/44.27, 44.26, 369/44.29, 44.35, 44.41, 53.22, 53.28, 44.23, 47.24, 124.5, 94, 47.4, 47.44, 53.23, 47.43

(56) References Cited

U.S. PATENT DOCUMENTS

| | | | |
|---|---|---|---|
| 4,634,896 A | 1/1987 | Shrinkle | 307/351 |
| 5,031,167 A | 7/1991 | Ishibashi et al. | 369/44.34 |
| 5,199,022 A * | 3/1993 | Suzuki et al. | 369/275.1 |
| 5,235,581 A | 8/1993 | Miyagawa et al. | 369/44.12 |
| 5,353,270 A | 10/1994 | Iimura | 369/54 |
| 5,381,394 A | 1/1995 | Yanagawa | 369/100 |
| 5,384,764 A | 1/1995 | Nordal | 369/275.1 |
| 5,416,757 A | 5/1995 | Luecke et al. | 369/44.23 |
| 5,446,565 A | 8/1995 | Komma et al. | 359/19 |
| 5,452,284 A | 9/1995 | Miyagawa et al. | 369/124 |
| 5,463,602 A | 10/1995 | Oka et al. | 369/44.29 |
| 5,475,664 A | 12/1995 | Shimizuma et al. | 369/44.29 |
| 5,490,127 A | 2/1996 | Ohta et al. | 367/116 |
| 5,541,900 A | 7/1996 | Ito et al. | 369/44.31 |
| 5,638,353 A | 6/1997 | Takahashi | 369/112 |
| 5,682,373 A | 10/1997 | Kim | 369/112 |
| 5,701,288 A | 12/1997 | Seong | 369/112 |

FOREIGN PATENT DOCUMENTS

| | | | | |
|---|---|---|---|---|
| DE | 4308531 A1 | 9/1994 | | G11B/7/125 |
| EP | 0530023 B2 | 3/1993 | | G11B/7/09 |
| EP | 0558052 B1 | 9/1993 | | G11B/7/12 |
| JP | 53-69006 | 6/1978 | | G11B/7/00 |
| JP | 61-140429 | 8/1986 | | G11B/7/09 |
| JP | 61-174026 | 10/1986 | | G11B/7/135 |

\* cited by examiner

*Primary Examiner*—Thang V. Tran
(74) *Attorney, Agent, or Firm*—Oblon, Spivak, McClelland, Maier & Neustadt, P.C.

(57) ABSTRACT

This invention is applicable to an apparatus using an optical pickup to reproduce information recorded on an optical recording medium. By enabling the automatic setting of reproducing conditions applicable to a mounted optical recording medium so that a plurality of types of optical recording media can be compatibly mounted, the present invention enables recorded information to be reliably reproduced even if the recording medium has a low recording density.

11 Claims, 15 Drawing Sheets

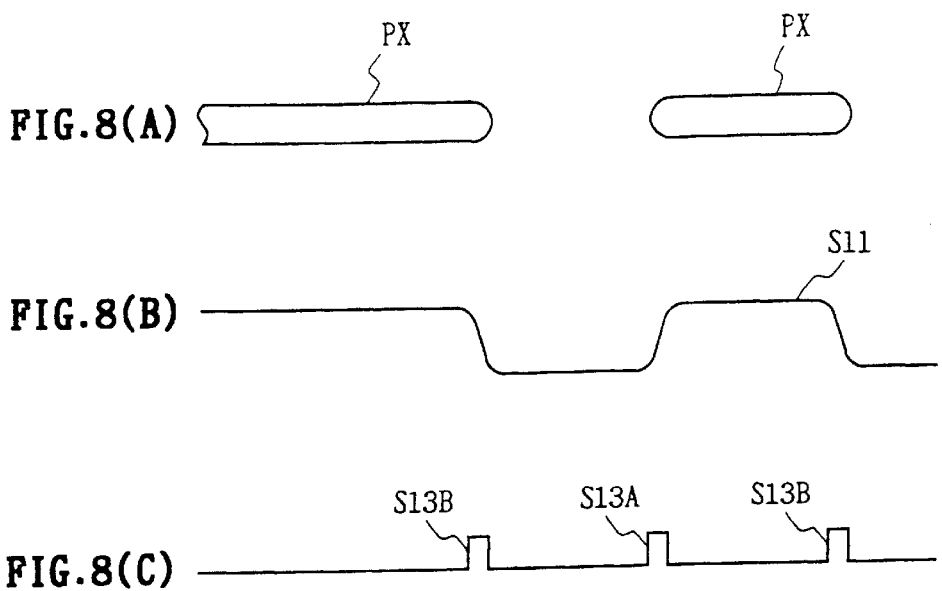
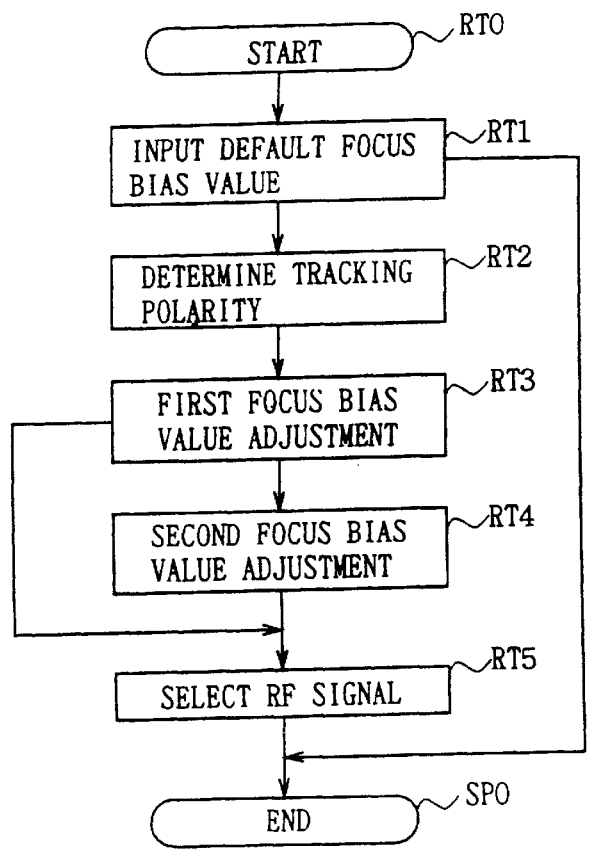
FIG.9

| ATIP INFORMATION | 1 | 2 | 3 | 4 | . . . . |
|---|---|---|---|---|---|
| FB PRESET VALUE | 2 | -1 | 0 | 4 | . . . . |

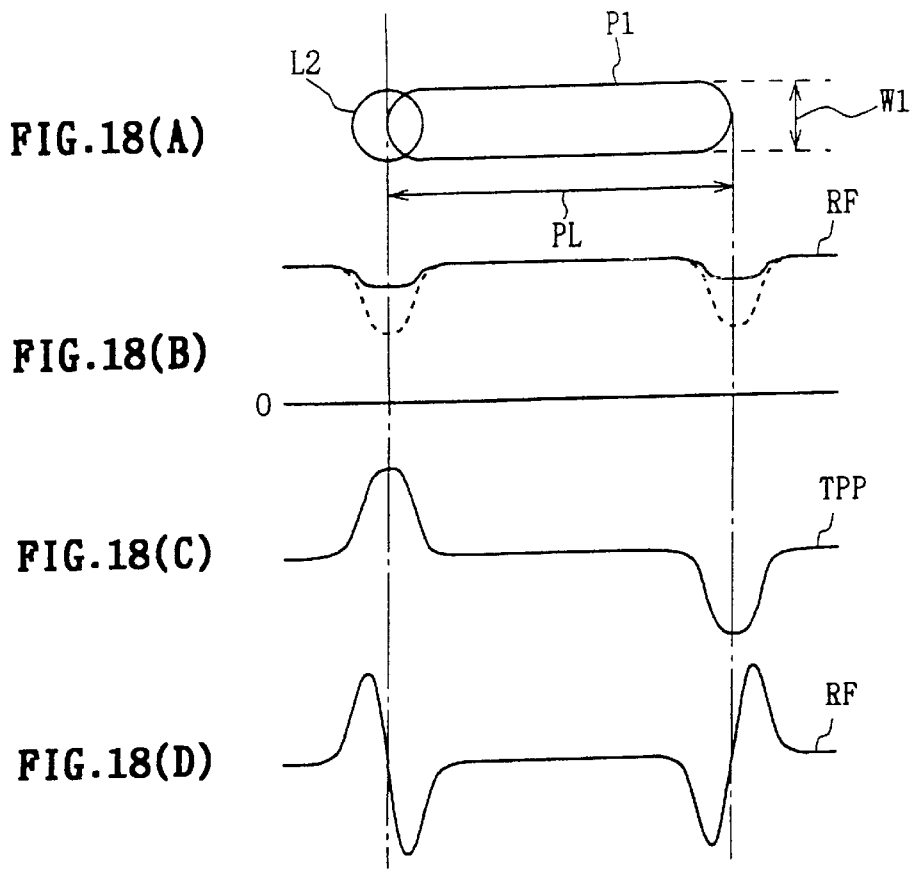
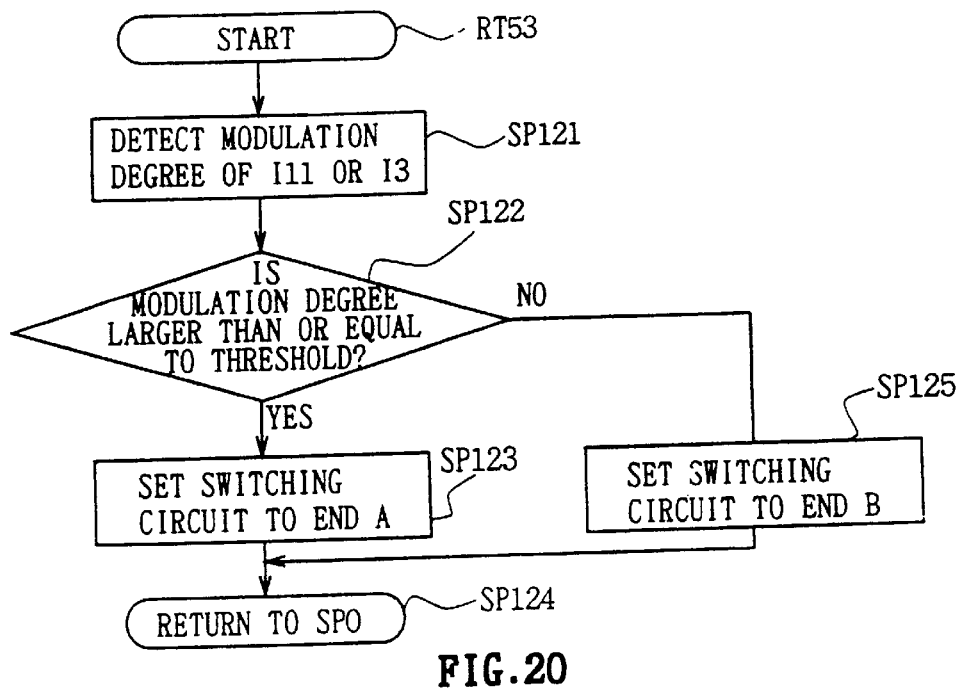

OPTICAL RECORDING MEDIUM REPRODUCING APPARATUS

This is a divisional of application Ser. No. 09/217,695, filed Dec. 21, 1998 now U.S. Pat. No. 6,167,007, which is a divisional of application Ser. No. 08/716,266, filed Sep. 24, 1996 now U.S. Pat. No. 6,034,936.

TECHNICAL FIELD

The present invention relates to an optical recording medium reproducing apparatus, and in particular, to an optical, recording medium reproducing apparatus adapted to reproduce optically recorded information recorded on an optical recording medium by irradiating the medium with a light spot of a laser beam.

BACKGROUND ART

Compact discs (CDs) have conventionally been used as optical recording medium reproducing apparatus of this kind, wherein the disc as an optical recording medium is irradiated via an optical system 0.45 in numerical aperture (NA) with a laser beam 780 [nm] in wave length which is generated by a laser diode.

In recent years, however, new laser beam sources with a wave length smaller than 780 [nm] (for example, red=680 [nm], and semiconductor lasers of green and blue) have been developed as light sources for optical recording medium reproducing apparatuses. These new laser beam sources serve to implement recording medium reproducing apparatuses that can reproduce recording media with a higher recording density than compact discs. These recording medium reproducing apparatuses that can reproduce recording media with a higher recording density than compact discs desirably have a compatible reproducing function that also enables conventional compact discs (CDs) to be reproduced.

The diameter of the light spot that can be formed by a laser beam of a large wave length is selected so as to be somewhat larger than the width W1 of pits P1 formed in the compact disc as recorded information as shown by reference L1 in FIG. 1(A). This allows the light spot L1 to constantly lie across the width W1 during movement when entering the pit P1 from land to scan it.

A sum signal (hereafter referred to as an "RF signal") can thus be obtained from an optical pickup based on light reflected from the compact disc because of the light spot L1 in FIG. 1 (A). The RF signal falls from a first signal level LV11 to a second signal level LV12 when the light spot L1 passes through the end of the pit P1, and subsequently maintains the signal level LV12 until the light spot L1 has passed the pit P1 with itself lying across the pit P1, as shown in FIG. 1(B). This results in a sum signal in which the signal level changes in response to the lengths of the land and the pit P1 because the light spot L1 scans both the land and the pit P1.

Thus, the signal level of the RF signal RF1 decreases during scanning due to the interference between light reflected from the pit P1 and light reflected from a reflecting surface (the land) located around the pit P1. This also occurs when a light spot L2 of a relatively small wave length scans a pit P2 formed in an optical disc that has a higher recording density than the compact discs.

Each time the light spot L2 formed by a laser beam of a relatively small wave length enters the pit P2, an RF signal RF2, the signal level of which changes from LV21 to LV22 in response to recorded information can be obtained as shown in FIG. 2(B).

The light spot L2 formed by a laser beam of a relatively small wave length can be converged on a small diameter compared to the light spot L1 formed by a laser beam of a relatively large wave length, so the width W2 of the pit P2 may be smaller than the width W1 of the pit P1. As a result, optical recording medium reproducing apparatuses using the light spot L2 formed by a laser beam of a relatively small wave length deal with a high recording density, while optical recording medium reproducing apparatuses using the light spot L1 formed by a laser beam of a relatively large wave length cope with a low recording density.

If a high recording density optical recording medium reproducing apparatus is used to directly reproduce a compact disc (CD) designed to be reproduced by a low recording density optical recording medium reproducing apparatus, the diameter of the light spot L2 is smaller than or equal to the width W1 of the pit P1, as shown in FIG. 3(A). In this case, light reflected from the land and light reflected from the pit P1 interfere with each other when the light spot L2 enters and leaves the pit P1, whereas no interference occurs while the light spot L2 is scanning the pit P1 because it is totally included within the pit P1. The signal level of an RF signal RF3 changes from LV31 to LV32 only at both ends of the pit P1, as shown in FIG. 3(B).

Although the signals shown in FIGS. 1(B) and 2(B) can be detected by integral detection, the signal shown in FIG. 3(B) cannot be detected by such detection but requires differential detection. The differential detection, however, has a higher error rate than the integral detection.

This invention is proposed in view of the above points, and its objective is to provide an optical recording medium reproducing apparatus that performs reproducing operations using a light spot formed by a laser beam of a relatively small wave length and which can compatibly reproduce low recording density optical recording media.

DISCLOSURE OF THE INVENTION

This invention provides an optical recording medium reproducing apparatus that reproduces information recorded on an optical recording medium with a plurality of pits formed along tracks based on the recorded information, comprising: a laser beam emitting means for emitting a laser beam; a focus control means for controlling the focusing of the laser beam on the optical recording medium; and a control means for controlling the focus control means so as to increase the spot diameter of the laser beam emitted onto the optical recording medium when the medium has a low recording density with pits relatively sparsely arranged compared to the case in which the medium has a high recording density with pits relatively densely arranged.

Thus, when the optical recording medium mounted in the optical recording medium reproducing apparatus has a low recording density, this invention enables the information recorded in the tracks of the mounted low recording density recording medium to be reliably reproduced as in high recording density recording media, by using the control means to control the focus control means so as to increase the spot diameter of the laser beam.

According to this invention, to provide control in such a way that the spot diameter of the laser beam will be increased, the control means supplies different focus bias values depending upon whether the optical recording medium has a high or a low recording density.

In addition, this invention comprises a light receiving means for receiving a laser beam reflected from the optical recording medium; a servo error signal generating means for generating a servo error signal based on an output signal from the light receiving means; a polarity detecting means for detecting the polarity of the servo error signal; and a polarity selecting means for selecting the polarity of the servo error signal based on an output signal from the polarity detecting means, thereby reliably enabling the optical recording medium to enter a servo operation state even when the polarity of the servo error signal from the optical recording medium differs from that of standard optical recording media.

In addition, this invention comprises a light receiving means for receiving a laser beam reflected from the optical recording medium; a read (RF) signal generating means for generating a read (RF) signal for the recorded information based on an output signal from the light receiving means; a tangential push-pull signal generating means for generating a tangential push-pull signal based on the output signal from the light receiving means; an error detecting means for detecting the error conditions of the output signal from the light receiving means; and a selecting means for selectively outputting the read (RF) or tangential push-pull signal, wherein the control means controls the selecting means based on an output signal from the error detecting means. This constitution enables the selecting means to select the tangential push-pull signal (or a differential detection signal) in order to switch to a state in which the recorded information can be reliably reproduced, when no read (RF) signal (or integral detection signal) of a sufficient magnitude of signal level can be obtained to prevent the recorded information from being completely reproduced.

Furthermore, this invention comprises a light receiving means for receiving a laser beam reflected from the optical recording medium; an input read (RF) signal generating means for generating an input read (RF) signal for the recorded information based on an output signal from the light receiving means; a tracking error generating means for generating a tracking error signal based on the output signal from the light receiving means; an automatic level control means for providing control so as to maintain a constant signal level of the input read (RF) signal and outputting an output read (RF) signal; and a normalizing means for normalizing the signal level of the tracking error signal based on the signal level of the input read (RF) signal, thereby enabling the mounted optical recording medium to perform stable tracking operations even when the medium has an extremely high or low reflectance.

This invention thus employs an optical pickup that forms a light spot of a small wave length in order to reproduce an optical recording medium with a high recording density of recorded information, and can automatically set optimal reproducing conditions when a low recording density optical recording medium is mounted instead of the current high recording density optical recording medium, thereby enabling the implementation of an optical recording medium reproducing apparatus that can compatibly reproduce various optical recording media.

BRIEF DESCRIPTION OF THE DRAWINGS

FIGS. 8(A) to 8(C) are a schematic diagram and a signal waveform chart describing a signal from each component of the asymmetry modulation degree detecting circuit 58 in FIG. 6.

FIG. 9 is a flowchart showing a procedure for calibration.

FIGS. 18(A) to 18(D) are a schematic diagram and signal waveform charts describing an integrally and a differentially detecting methods.

FIG. 20 is a flowchart showing a subroutine RT53 for the third selecting method which is included in the subroutine RT5 for selecting an RF signal in FIG. 9.

BEST MODE FOR CARRYING OUT THE INVENTION

One embodiment of this invention is described below in detail with reference to the drawings.

(1) Overall Constitution

Figure 4:
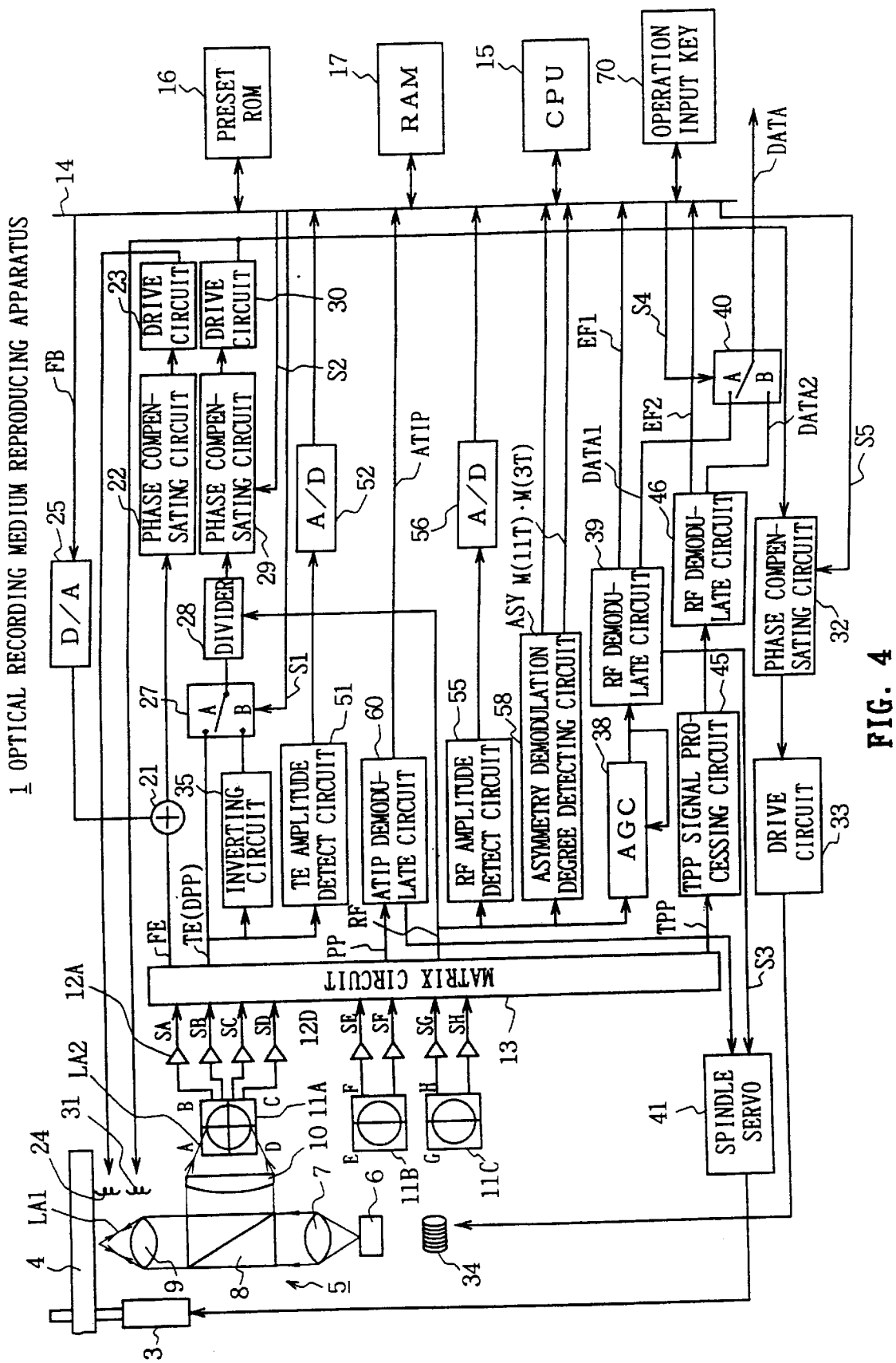
FIG. 4 is a block diagram showing the overall configuration of an optical recording medium reproducing apparatus according to this invention.

FIG. 4 generally shows an optical recording medium reproducing apparatus as 1 wherein a laser beam emitted from an optical pickup 5 forms a light spot on a disc 4 as an optical recording medium rotated by a spindle motor 3. The laser beam has a relatively small wave length that is optimal for the reproduction of high recording density discs.

Figure 2A:
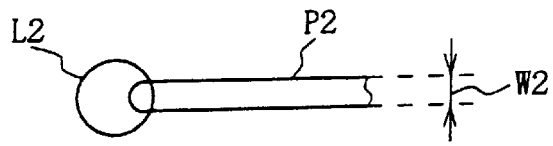
FIGS. 2(A) and 2(B) are a schematic diagram and a signal waveform chart, respectively, showing a method for using a light spot formed by a laser beam of a small wave length in order to reproduce pits with information densely recorded therein.
Figure 2B:
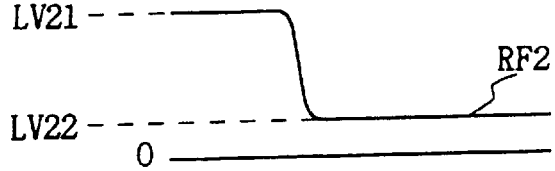

As described above in FIG. 2, the optical pickup 5 sequentially passes through a collimator lens 7, a beam splitter 8, and an objective lens 9, a laser beam from a laser diode 6 for generating a light beam of a relatively small wave length which reads high recording density discs, thereby forming irradiation light LA1, with which the disc 4 is irradiated. The optical pickup 5 also sequentially passes return light LA2 through the objective lens 9, the beam splitter 8, and a lenticular lens 10, and the light is then divided through a grating (not shown) into a quarterly dividing detector 11A with detecting elements A, B, C, and D and two dividing detectors 11B and 11C with detecting elements E and F, and G and H, respectively, and then enters the disc.

The detecting elements A, B, C, and D, and Z, F, G, and H apply detection signals SA, SB, SC, and SD, SE and SF, and SG and SH corresponding to the distribution of the light intensity over the four-split detector 11A and the halving detectors 11B and 11C, respectively, which is generated by the return light LA2, to a matrix circuit 13 via amplifying circuits 12A, 12B. 12C, and 12D, 12E and 12F, and 12G and 12H, respectively.

Figure 5:
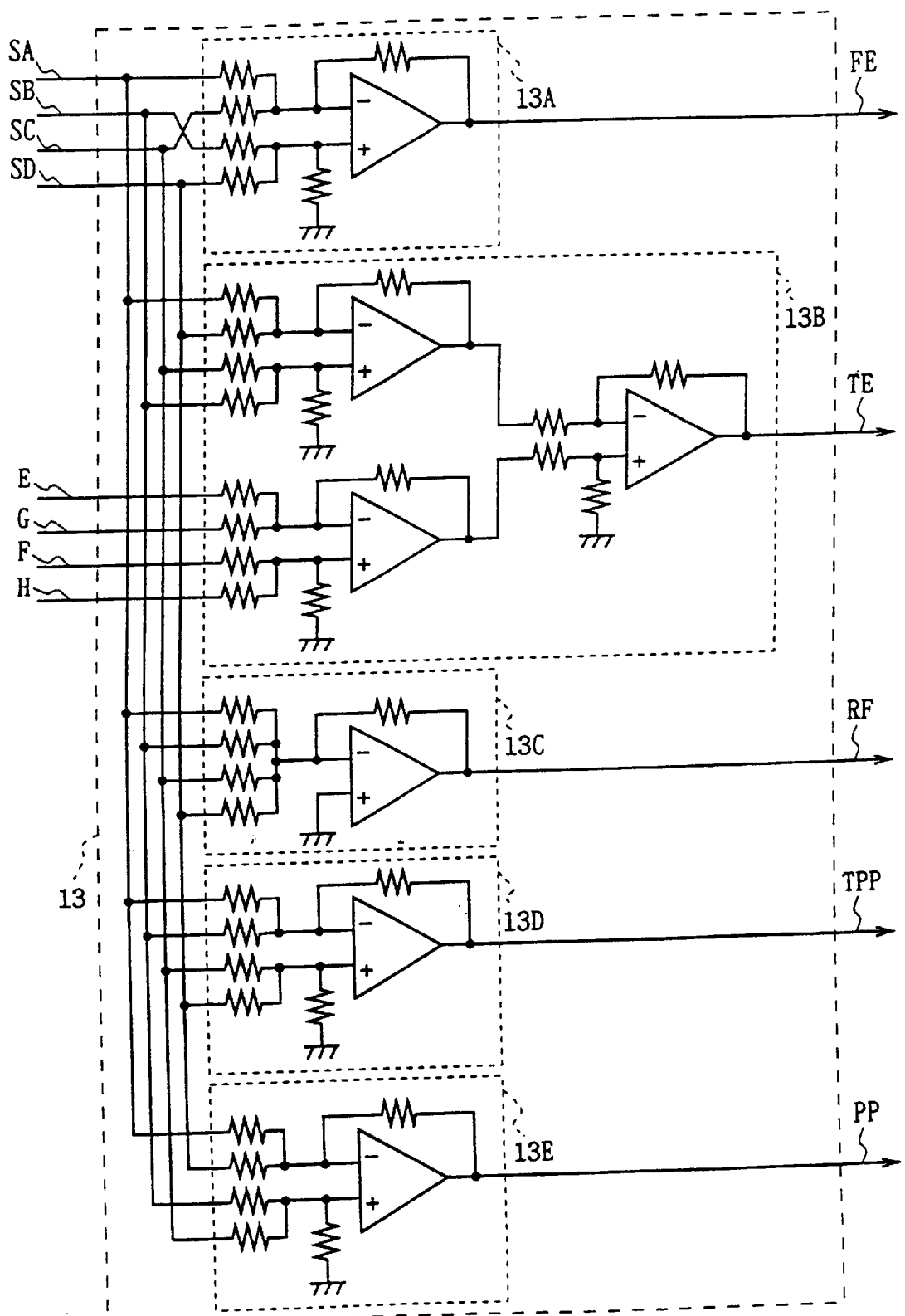
FIG. 5 is a connection diagram showing the detailed constitution of a matrix circuit 13 in FIG. 4.

As shown in FIG. 5, the matrix circuit 13 has a focusing error signal forming circuit 13A for forming a focusing error signal FE(=(SA+SC)−(SB+SD)) based on astigmatism.

The matrix circuit 13 also has a tracking error signal forming circuit 13B for forming a tracking error signal TE (=((SA+SD)−(SB+SC))−×((SE+SG)−(SF+SH))) using the detection signals SA and SD, and SB and SC from the detecting elements of the four-split detector 11A, A and D, and B and C, respectively, based on the differential push-pull method.

The tracking error signal may be formed as TE(=(SA+SD)−(SB+SC)) based on the push-pull method.

The matrix circuit 13 also has a sum signal (RF signal) forming circuit 13C for forming an RF signal RF(=SA+SB+SC+SD) using the detection signals from all the detecting elements A, B, C, and D, based on the integral detecting method.

The matrix circuit 13 also has a tangential push-pull signal forming circuit 13D for forming a tangential push-pull signal TPP(=(SA+SB)−(SC+SD)) using the detection signal from the two detecting elements A and B and the detection signal from the two detecting elements C and D in such a way that the light spot is divided into two in the direction perpendicular to the light spot scanning direction, based on the differential detecting method.

The matrix circuit 13 also has a push-pull signal forming circuit 13E used when a recordable optical disc with a pregroove (for example, a CD-R, CD-MO, or CD-E) is to be reproduced, in order to form a push-pull signal PP(=(SA+SD)−(SB+SC)) as the difference between the detection signal from the two detecting elements A and D and the detection signals from the two detecting elements B and C based on the push-pull method, in such a way that the light spot is divided along a parting line extending along the light spot scanning direction.

In this case, the pregroove is provided beforehand in that region of the recordable optical disc in which data has not been recorded yet in order to enable tracking. That is, the push-pull signal PP is used to reproduce recordable optical discs.

In the matrix circuit 13, the signal thus formed on the basis of the detection signals SA, SB, SC, and SD from the detecting elements A, B, C, and D is used via a bus 14 for arithmetic processing in which a central processing unit (CPU) 15 executes programs stored in a preset ROM 16 using a RAM 17 as a work memory. Based on the results of the arithmetic operation, the optical pickup 5 is then controlled so as to perform a reading operation in optimal reproducing conditions for the disc 4 mounted on a spindle motor 3.

The focusing error signal FE obtained from the focusing error signal forming circuit 13A (FIG. 5) in the matrix circuit 13 is delivered to a drive circuit 23 via a summing circuit 21 and a phase compensating circuit 22. This allows the provision of drive output to a focusing actuator 24 for the optical pickup 5 which causes the focusing error signal to have a negative focus bias value, resulting in the formation of a focusing servo loop.

In this focusing servo loop according to this embodiment, a focus bias value FB is provided to the summing circuit 21 from the CPU 15 via the bus 14 and a digital analog converting circuit 25. This enables the optical pickup 5 to be positioned in a focus position corresponding to the focus bias value FB.

The tracking error signal TE obtained from the tracking error signal forming circuit 13B (FIG. 5) in the matrix circuit 13 is provided to a drive circuit 30 via a switching input end A of a switching circuit 27, a divider 28, and a phase compensating circuit 29. This allows drive output to be applied to a tracking actuator 31 for the optical pickup 5, resulting in the formation of a tracking servo loop.

In addition, drive output from the drive circuit 30 is provided to a drive circuit 33 via a phase compensating circuit 32. This allows drive output to be supplied to a thread actuator 34 for the optical pickup 5, resulting in the formation of a thread servo loop.

In this embodiment, when a switching control signal S1 is provided from the CPU 15 via the bus 14, the switching circuit 27 delivers a tracking error signal TE with its polarity inverted by an inverting circuit 35, to the divider 28 through the switching input end B. The polarity of the tracking error signal TE is thus inverted.

The divider 28 receives the RF signal RF from the RF signal forming circuit 13C (FIG. 5) in the matrix circuit 13. This allows the signal level of the tracking error signal TE to be normalized according to the magnitude of the signal level of the RF signal RF. Consequently, even if the mounted discs 4 have different reflectance, the amplitude of the tracking error signal TE will not be affected by these differences.

A phase control signal S2 is provided to the phase compensating circuit 29 from the CPU 15 via the bus 14. This allows drive output for track jump to be supplied to the tracking actuator 31 from the drive circuit 30 upon track jump.

Upon track jump, a thread drive signal S5 is delivered to the phase compensating circuit 32 from the CPU 15 via the bus 14. The phase compensating circuit 32 then drives the thread actuator 34 via the drive circuit 33 to cause the optical pickup 5 to perform a thread operation.

The RF signal obtained from the RF signal forming circuit 13C in the matrix circuit 13 is controlled by an AGC circuit 38 to a predetermined gain and then provided to an RF signal demodulating circuit 39. The RF signal demodulating circuit 39 demodulates reproduced data DATA1 from the RF signal RF as the results of integral detection, and externally sends the reproduced data DATA1 via the switching input end A of the switching circuit 40 as reproduced data DATA from the optical recording medium reproducing apparatus 1.

If when demodulating the reproduced data DATA1, the RF signal demodulating circuit 39 cannot correct an error based on error correction code (ECC) information provided for each frame, it sends out an error flag signal EF1 to the CPP 15 via the bus 14. This enables the CPU 15 to determine whether or not reproduced data DATA1 can be appropriately demodulated from the RF signal from the currently mounted disc 4 based on the integral detecting method.

In this embodiment, the RF signal demodulating circuit 39 includes an RF reference clock generating circuit, and supplies a difference signal S3 between the current RF reference clock signal and a clock signal for the demodulated RF signal to a spindle servo circuit 41 to drive and control the spindle motor 3 so as to reduce the difference signal S3 to zero, resulting in the formation of a spindle servo loop.

The tangential push-pull signal TPP obtained from the tangential push-pull signal forming circuit 13D (FIG. 5) in the matrix circuit 13 is delivered to an RF signal demodulating circuit 46 via a tangential push-pull signal processing circuit 45. The RF signal demodulating circuit 46 thus demodulates reproduced data DATA2 as the results of differential detection, and externally sends the data DATA2 via the switching input end B of the switching circuit 40 as reproduced DATA from the optical recording medium reproducing apparatus 1.

If when demodulating the reproduced data DATA2, the RF signal demodulating circuit 46 cannot correct an error based on the ECC information provided for each frame, it sends out an error flag signal EF2 to the CPU 15 via the bus 14. This enables the CPU 15 to determine whether or not reproduced data DATA2 can be appropriately demodulated from the RF signal from the currently mounted disc 4 based on the differential detecting method.

When determining based on the error flag signal EF1 that the error upon the demodulation of the reproduced data DATA1 obtained by the integral detecting method is large, the CPU 15 supplies a switching control signal S4 to the switching circuit 40 via the bus 14 so as to cause the circuit 40 to perform a switching operation. This allows the reproduced data DATA2 obtained by the differential detecting method to be sent out via the switching circuit 40 as reproduced data DATA from the optical recording medium reproducing apparatus 1.

Thus, if the data cannot be correctly reproduced from the results of the integral detection, the results of the differential detection in place of the integral detection can be sent out instead as the reproduced data.

In this embodiment, the tracking error signal TE can be loaded in the CPU 15 via a tracking error amplitude detecting circuit 51, an analog digital converting circuit 52, and the bus 14. The CPU 15 can provide control compatible with the disc 4 by identifying the tracking error conditions of the optical pickup 5.

In addition, the amplitude of the RF signal RF is detected by an RF amplitude detecting circuit 55, and supplied to the CPU 15 via an analog digital converting circuit 56 and the bus 14. This enables the CPU 15 to determine the amplitude of the RF signal.

The RF signal RF is also provided to an asymmetry modulation degree detecting circuit 58. Upon reading data 11T to 3T from the disc 4 as recorded information, the asymmetry modulation degree detecting circuit 58 supplies an asymmetry detection signal ASY to the CPU 15 via the bus 14 indicating the asymmetry of the lengths of the land and the pit in the RF signal, and sends out modulation degree detection signals M (11T and 3T) for the longest data 11T and the shortest data 3T, respectively, to the CPU 15 via the bus 14.

Figure 6:
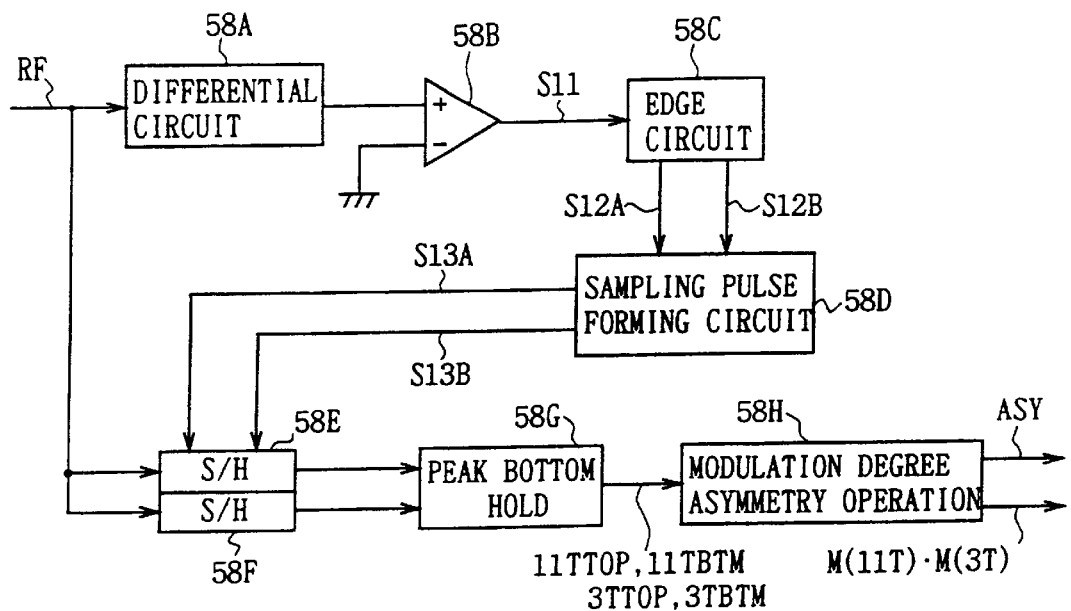
FIG. 6 is a connection diagram showing the detailed constitution of an asymmetry modulation degree detecting circuit 58 in FIG. 4.
Figure 7:
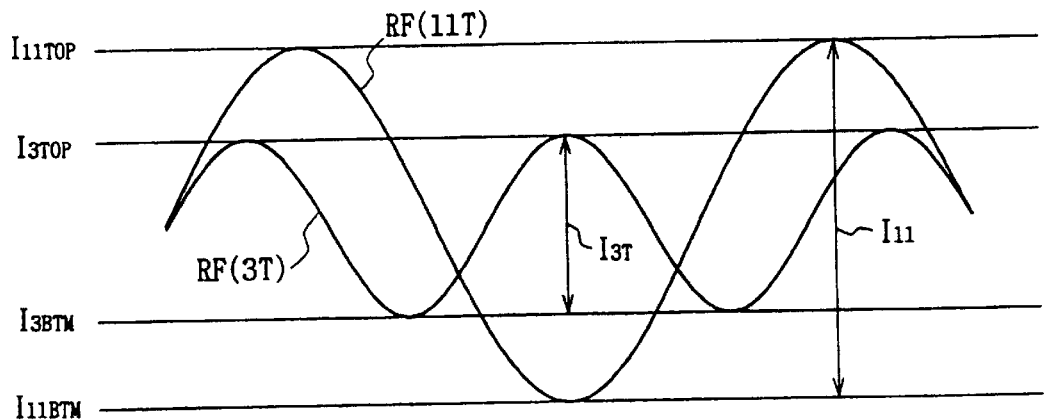
FIG. 7 is a signal waveform chart showing reproduction signals for recorded information 11T to 3T.

As shown in FIG. 6, in the asymmetry modulation degree detecting circuit 58, a differential circuit 58A differentiates the RF signal RF, and the output of the differential circuit 58A is then compared to a ground potential by a comparing circuit 58B in order to obtain a rectangular wave signal S11 (FIG. 8(B)) with its signal level rising or falling when the RF signal of a data length of 3T to, 11T (FIG. 7) reaches a peak or a bottom level, respectively. An edge detecting circuit 58C further obtains a rising and a falling edge detection pulses S12A and S12B corresponding to the rising and the falling edge of the rectangular wave signal S11, and provides it to a sampling pulse forming circuit 58D.

The sampling pulse forming circuit 58D then generates sampling pulses S13A and S13B corresponding to the rising pulse S12A and the falling pulse S12B. This allows sampling hold circuits 58E and 58F to sample and hold the signal level of the RF signal using a sampling pulse (FIG. 8(C)) rising when the light spot passes the leading and the trailing end of a pit PX, as shown in FIG. 8(A). The sample hold value is accumulated in a peak bottom hold circuit 58G.

The peak bottom hold circuit 58G thus has the peak and bottom values for the shortest data 3T to the longest data accumulated therein. A modulation degree asymmetry operation circuit 58H executes arithmetic operations for the following equations (1) to (3) based on the peak and the bottom values of the longest pit, for example, 11TTOP and 11TBTM and the peak and the bottom values of the shortest pit, for example, 3TTOP and 3TBTM.

$$M(11T) = \frac{I_{11TOP} - I_{11BTM}}{I_{11TOP}} \quad (1)$$

$$M(3T) = \frac{I_{3TOP} - I_{3BTM}}{I_{11TOP}} \quad (2)$$

$$ASY = \frac{(I_{3TOP} - I_{3BTM}) - (I_{11TOP} + I_{11BTM})}{2 \cdot (I_{11TOP} - I_{11BTM})} \quad (3)$$

The modulation degree asymmetry operation circuit 58H thus determines the modulation degrees (11T and 3T) of the longest and the shortest pits as well as the asymmetry and then sends them out as the output of the asymmetry modulation degree detecting circuit 58. The CPU 15 can thus confirm the modulation degree and asymmetry of the reproduced information recorded on the currently mounted disc 4, based on the RF signal.

Furthermore, the push-pull signal PP from the push-pull signal forming circuit 13E (FIG. 5) in the matrix circuit 13 is delivered to an absolute time in the pregroove (ATIP) data demodulating circuit 60. The absolute time in the pregroove data ATIP demodulated by the absolute time in the pregroove (ATIP) data demodulating circuit 60 is supplied to the CPU 15 via the bus 14.

Thus, when a recordable optical disc (referred to as a "CD-R") with a pregroove according to the standard is mounted as the disc 4, the CPU 15 can confirm the absolute time in the pregroove data ATIP inserted into the pregroove according to a specified cycle (for example, a 10 field cycle).

In the above configuration, when either a high or a low recording density optical disc is loaded as the disc 4, the central processing unit (the CPU) 15 of the optical recording medium reproducing apparatus 1 sets reproducing conditions for the apparatus 1 by carrying out a calibration procedure RT0 in FIG. 9.

After entering the calibration procedure RT0, the CPU 15 first executes a subroutine RT1 to set as a focus bias default value an optimal focus bias value for a high recording density disc as the mounted disc 4.

If the data can then be reproduced correctly, the CPU 15 proceeds to step SP0 to end the calibration procedure. Otherwise, the CPU 15 determines that a low recording density disc has been loaded as the disc 4, and proceeds to the next subroutine RT2.

In the subroutine RT2, the CPU 15 determines an optimal polarity of the tracking error signal for the mounted disc 4, and in the subsequent subroutine RT3, sets the focus bias value to the preset focus bias value specified for the type of the mounted disc, as first focus bias value adjustment processing.

If required, the CPU 15 then proceeds to a subroutine RT4 to carry out second focus bias adjustment processing, thereby adjusting the focus bias value according to the recording conditions of the information recorded on the mounted disc 4.

After the focus bias value adjustment has been finished, the CPU 15 determines whether the integral or the differential detecting processing is used to demodulate the RF signal obtained from the mounted disc 4 according to the conditions of the RF signal in a subroutine RT5, and then ends the calibration procedure RT0 in step SP0.

Therefore, the CPU 15 can set optimal reproducing conditions depending on the standards for the mounted disc 4 and the recording conditions of the recorded information in order to set reproducing conditions for the optical recording medium reproducing apparatus 1 so that the apparatus can compatibly reproduce various optical discs.

(2) Calibration Processing

In this embodiment, the CPU 15 executes the following processing in the subroutines RT1 to RT5 constituting the calibration procedure RT0.

(2-1) Inputting a Default Focus Bias Value (RT1)

Figure 10:
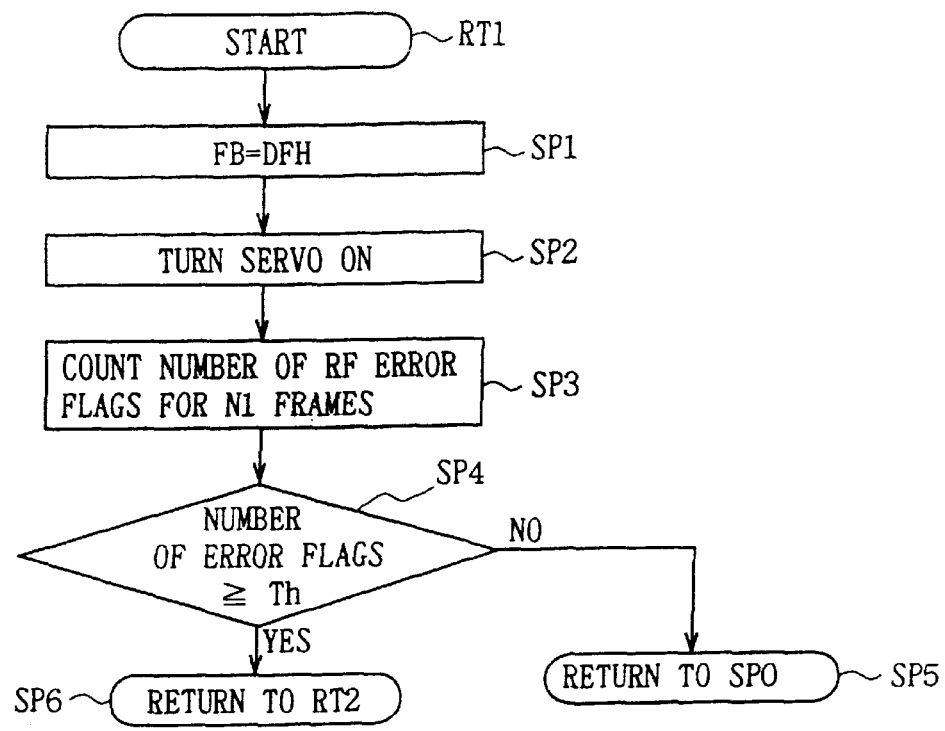
FIG. 10 is a flowchart showing a subroutine RT1 for inputting a default focus bias value in FIG. 9.

After entering the subroutine RT1 for inputting a default focus bias value in FIG. 9, as shown in FIG. 10, in step SP1, the CPU 15 first sets as a focus bias value FB a high recording density focus bias value DFH that is most suited to the reproduction of high recording density discs.

The default high recording density focus bias value DFH is stored in the preset ROM 16 as the initial value set on the program. The CPU 15 supplies the default high recording density focus bias value DFH from the bus 14 via the digital analog converting circuit 25 to the summing circuit 21 constituting the focus servo loop, as the focus bias value.

The CPU 15 subsequently proceeds to step SP2 to turn on the focus servo loop, the tracking servo loop, and the spindle servo loop, and the focusing actuator 24 then controls the optical pickup 5 to a focus position corresponding to the default high recording density focus bias value DFH.

Under these conditions, the CPU 15 proceeds to step SP3 to supply the RF signal RF obtained from the RF signal forming circuit 13C in the matrix circuit 13, to the RF signal demodulating circuit 39 via the AGC circuit 38. The RF signal demodulating circuit 39 thus decodes a frame N1 of the reproduced data DATA1 in order to detect the error conditions of the data DATA1 an a frame basis based on the error correction codes ECC contained therein, and supplies the error flag signal EF1 to the CPU 15 via the bus 14. This causes the CPU 15 to count the number of times when the error flag has been generated.

The CPU 15 subsequently proceeds to step SP4 to determine whether or not the number of error flags is larger than a specified threshold Th.

The threshold Th is a value used to determine that the currently mounted disc 4 does not have a high recording density (that is, the disc 4 does not require scanning with a light spot formed by a laser beam of a small wave length). If a negative result is obtained in step SP4, this means that the currently mounted disc 4 has a high recording density. In this case, the CPU 15 returns to step SP0 of the main routine (FIG. 9) from step SP5 to end the calibration procedure RT0.

If a positive result is obtained in step SP4, however, this means that the modulated data based on the RF signal RF obtained from the matrix circuit 13 has caused a larger number of error flags than expected for high recording density discs to be transferred as the error flag signals EF1. The CPU 15 thus determines that the currently mounted disc 4 has a low recording density, and then returns to the subroutine RT2 of the main routine (FIG. 9) from step SP6.

Thus, the subroutine RT1 for inputting a default focus bias value executes calibration in such a way that the RF signal RF is read from the disc 4 with the focus bias value initialized so as to form an optimal light spot L2 for the reproduction of a pit P2 of a width W2 (FIG. 2) required for high recording density discs. Thus, in step SP4, the CPU 15 determines whether the disc 4 has a high or a low recording density, and in the case of a high recording density disc, sets an optimal focus bias value for the reproduction of the disc.

Otherwise, the CPU 15 subsequently carries out the subroutines RT2 to RT5 of the main routine (FIG. 9).

(2-2) Determining the Tracking Polarity (RT2)

Figure 11:
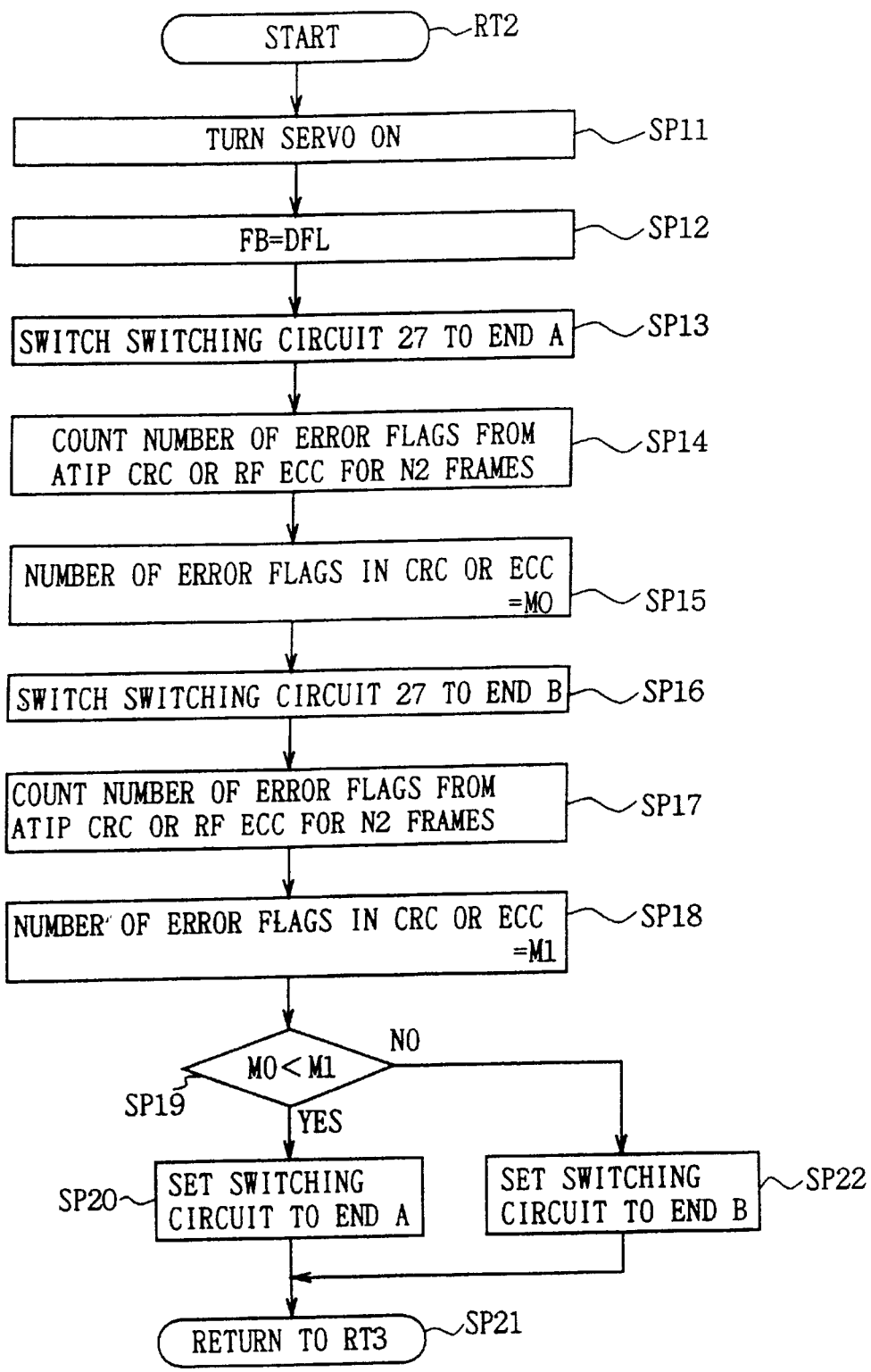
FIG. 11 is a flowchart showing a subroutine RT2 for determining the tracking polarity in FIG. 9.

Upon entering the subroutine RT2 for determining the tracking polarity from the subroutine RT1 for inputting a default focus bias value in the main routine (FIG. 9), the CPU 15 turns on the focus servo loop, the tracking servo loop, and the spindle servo loop in step SP11 in FIG. 11. The CPU 15 then sets the focus bias value FB to the default bias value DFL for low recording density discs in step SP12.

The CPU 15 subsequently proceeds to step SP13 to provide the switching control signal S1 via the bus 14 to the switching circuit 27 in the tracking servo loop to cause the circuit 27 to switch to the switching input end A. This provides control in such a way that the tracking error signal TE sent out from the tracking error signal forming circuit 13B in the matrix circuit 13 is directly passed to the divider 28.

Under these conditions, when a low recording density optical disc is mounted as the disc 4, the CPU 15 uses the RF signal demodulating circuit 39 to demodulate the RF signal RF from the RF signal forming circuit 13C in the matrix circuit 13 in order to count for N2 frames the number of error flags detected for each frame of the reproduced data DATA1 based on the error correction codes ECC added to the frame in the subsequent step SP14, and determines the count of error flags M0 in the next step SP15.

When, however, an optical disc with a pregroove (a CD-R) is mounted as the disc 4, the CPU 15 uses the absolute time in the pregroove (ATIP) data demodulating circuit 60 to demodulate the push-pull signal PP from the push-pull signal forming circuit 13E in the matrix circuit 13 in order to count for N2 frames the number of error flags detected for each frame of the reproduced data DATA1 based on the error correction codes CRC added to the frame in step SP14, and determines the count of error flags M0 in the next step SP15.

The CPU 15 subsequently delivers the switching control signal S1 to the switching circuit 27 to switch the circuit 27 to the switching input end B in step SP16. Consequently, the tracking error signal TE the polarity of which is inverted by the inverting circuit 35 is passed to the divider 28 via the switching input end B. This allows the polarity of the tracking error signal TE to be inverted.

Under these conditions, as in step SP14, the CPU 15 counts for N2 frames the number of error flags detected for each frame based on the error correction codes ECC in the RF signal or the error correction codes CRC in the absolute time in the pregroove (ATIP) data in Step S17, and determines the count of error flags M1 based on the results of the count in step SP18.

The CPU 15 subsequently proceeds to step SP19 to determine whether or not the count M0 is smaller than the count M1, and if the result is positive, sets the switching circuit 27 to the switching input end A in step SP20, and then returns to the subroutine RT3 of the main routine (FIG. 9) from step SP21.

If, however, the result is negative in step SP19, the CPU 15 sets the switching circuit 27 to the switching input end B in step SP19, and then returns to the subroutine RT3 of the main routine (FIG. 9) from step SP21.

In this manner, the CPU 15 executes the subroutine RT2 for determining the tracking polarity in order to set to a polarity that reduces the number of error flags in the reproduced data DATA1, the polarity of the tracking error signal that must be fed back to the tracking servo loop when an optimal default focus bias value for low recording density optical discs has been supplied. This enables the polarity of the tracking error signal to be set so as to feed back to the tracking servo loop a tracking error signal appropriate for the currently mounted low recording density optical disc 4.

For write once type optical discs (for example, CD-Rs) that enable data to be reproduced as in pits in optical discs for reproduction only by irradiating a pigment with a laser beam to vary the conditions of the pigment, the polarity of the tracking error signal is determined by the relationship between the wave length of the laser beam and the depth of the grooves. Thus, although the polarity of the tracking error may be inverted if a laser for high recording density recording media, that is, a laser of a small wave length is used, the above processing provides an appropriate polarity of the tracking error.

(2-3) First Focus Bias Value Adjustment (RT3)

Figures 12, 13:
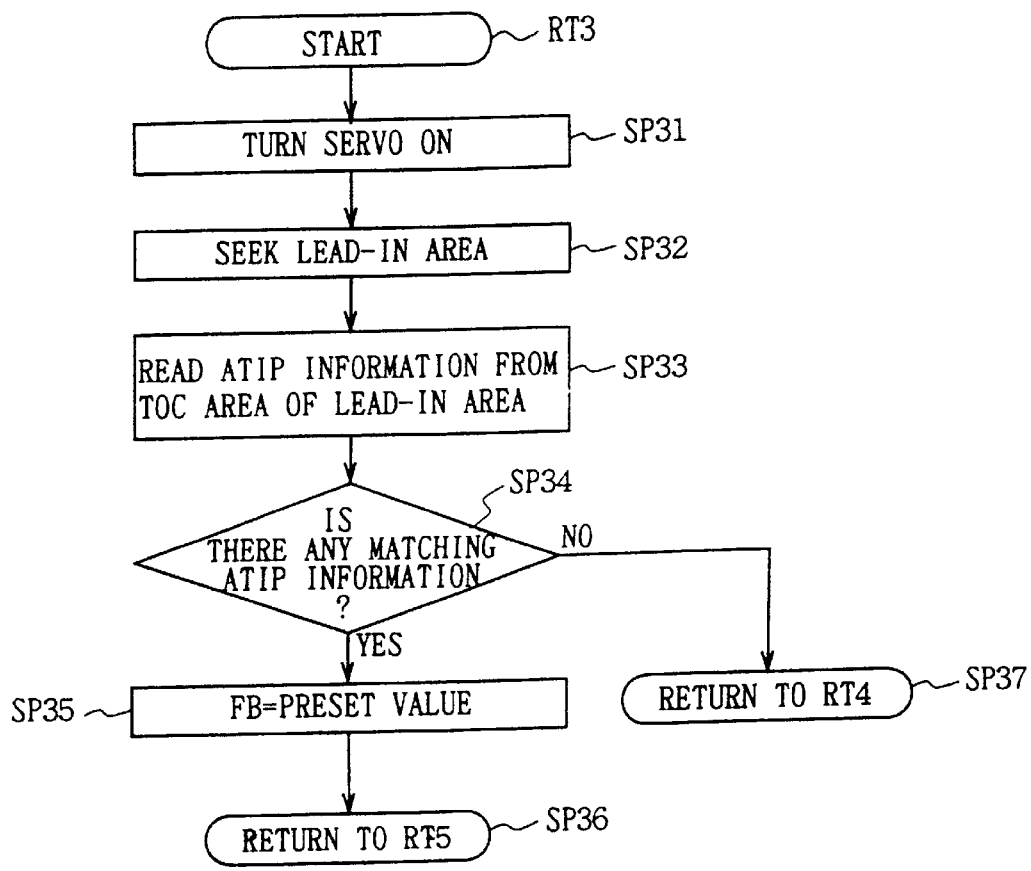
FIG. 12 is a flowchart showing a subroutine RT3 for first focus bias value adjustment in FIG. 9.
FIG. 13 is a table showing the relationship between the absolute time in the pregroove (ATIP) and the preset focus bias value processed in FIG. 12.

Upon entering the subroutine RT3 for first focus bias value adjustment of the main routine (FIG. 9), the CPU 15 turns on the focus servo loop, the tracking servo loop, and the spindle servo loop in step SP31, as shown in FIG. 12. In step SP32, the CPU 15 provides the thread drive signal S5 via the bus 14 to the phase compensating circuit 32 for the thread actuator 34 in order to cause the optical pickup 5 to seek to the leadin area of the storage area of the currently mounted disc 4. The CPU 15 subsequently reads the absolute time in the pregroove (ATIP) information reproduced from the Table of Contents (TOC) area of the leadin area in step SP33. It then determines in step SP34 whether or not there are matching time information ATIP.

The positive result in step SP34 means that the currently mounted disc 4 is a recordable optical disc in which optical pits containing recorded information are formed in the pregroove (for example, a CD-R). The CPU 15 then proceeds to step SP35 to set a preset value corresponding to the absolute time in the pregroove information ATIP as the focus bias value (that is, to rewrite the preset value DFL (step SP12 in FIG. 11) recorded in the drive circuit 23 in the focusing servo loop).

The CPU 15 thus ends the subroutine for first focus bias value adjustment, and returns to the subroutine RT5 of the main routine (FIG. 9) in step SP36.

These discs with the absolute time in the pregroove information ATIP (CD-Rs) include in the ATIP, absolute time in the disc information and manufacturer information indicating disc manufacturers.

The preset ROM 16 of the optical recording medium reproducing apparatus 1 contains preset information for the focus bias value, as shown in FIG. 13. Specifically, ATIP information showing disc manufacturers and the preset focus bias values corresponding to each disc manufacturer are stored in a table. Thus, when the table contains ATIP information matching the ATIP information obtained in step SP33, the focus bias value corresponding to this ATIP information can be set by reading it from the table.

The preset focus bias value that has been written to the preset ROM 16 in correspondence to the device manufacturer of the currently mounted disc 4 can thus be set as the focus bias value in order to set an optimal focus bias value for the currently mounted optical disc.

If the result is negative in step SP34, the currently mounted disc does not have a pregroove and is used only for reproduction, or the disc is of a write once type but has no information on disc manufacturers preset in the preset ROM 16. The CPU 15 then returns to the subroutine RT4 of the main routine (FIG. 9) from step SP37.

When the currently mounted disc 4 is a recordable disc with a pregroove (a CD-R), the first focus bias value adjustment is FIG. 12 enables the preset focus bias value recorded on the disc (the CD-R) to be used to set the optical pickup 5 in an optimal focus bias position.

(2-4) Second Focus Bias Value Adjustment (RT4)

Figure 14:
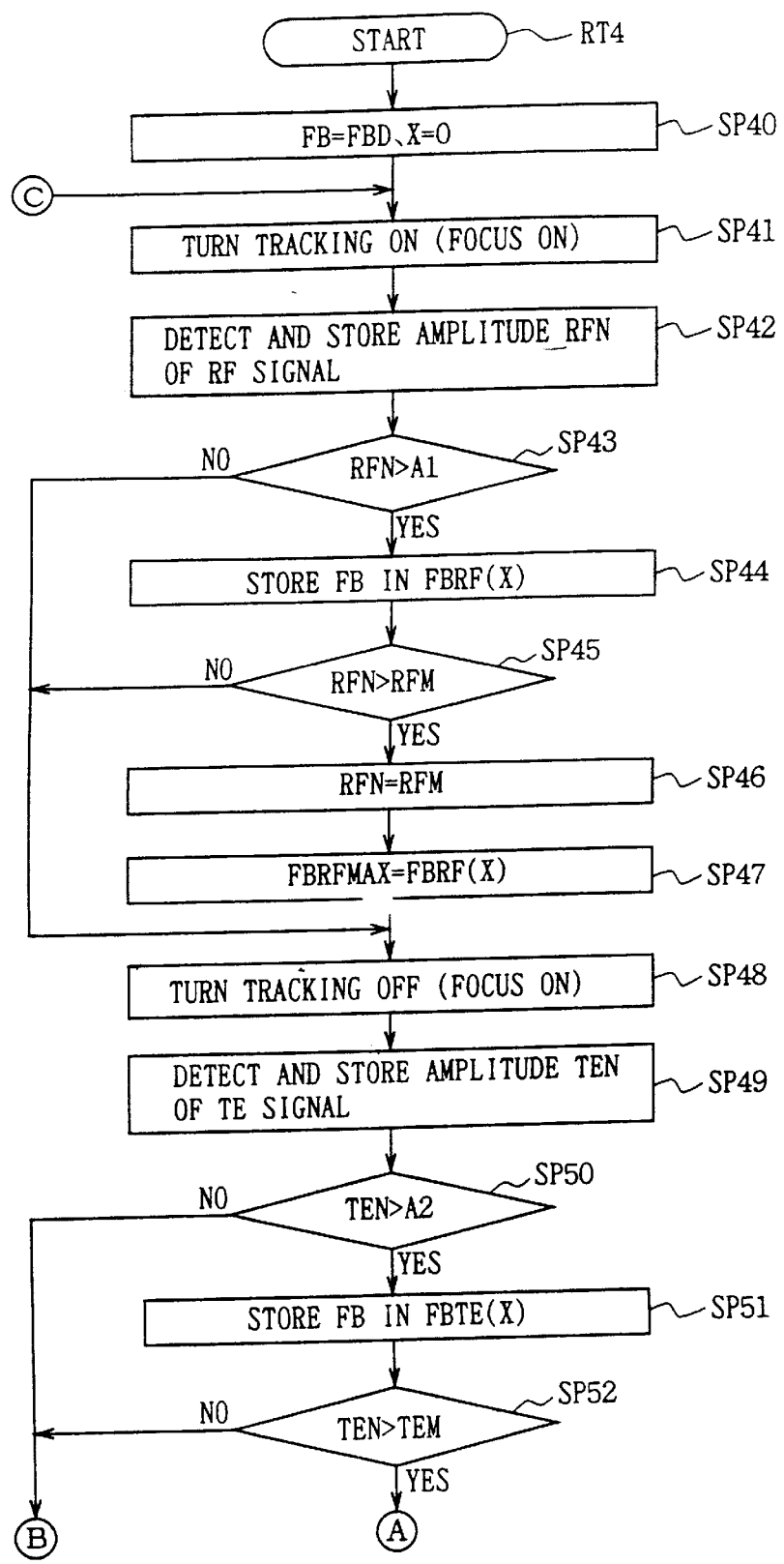
FIG. 14 is a flowchart showing a subroutine RT4 for a second focus bias value adjustment in FIG. 9.
Figure 15:
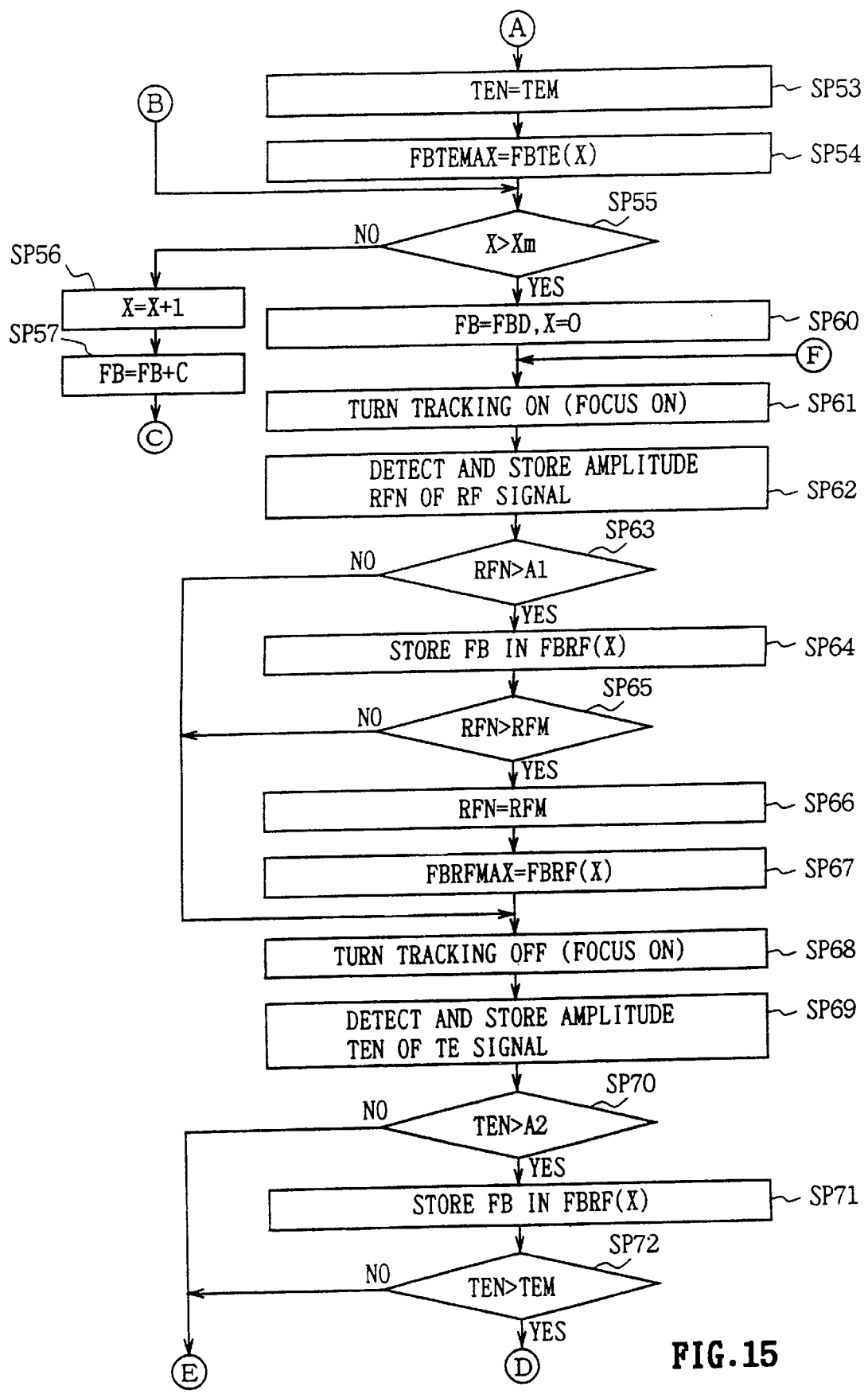
FIG. 15 is a flowchart showing the subroutine RT4 for the second focus bias value adjustment in FIG. 9.
Figure 16:
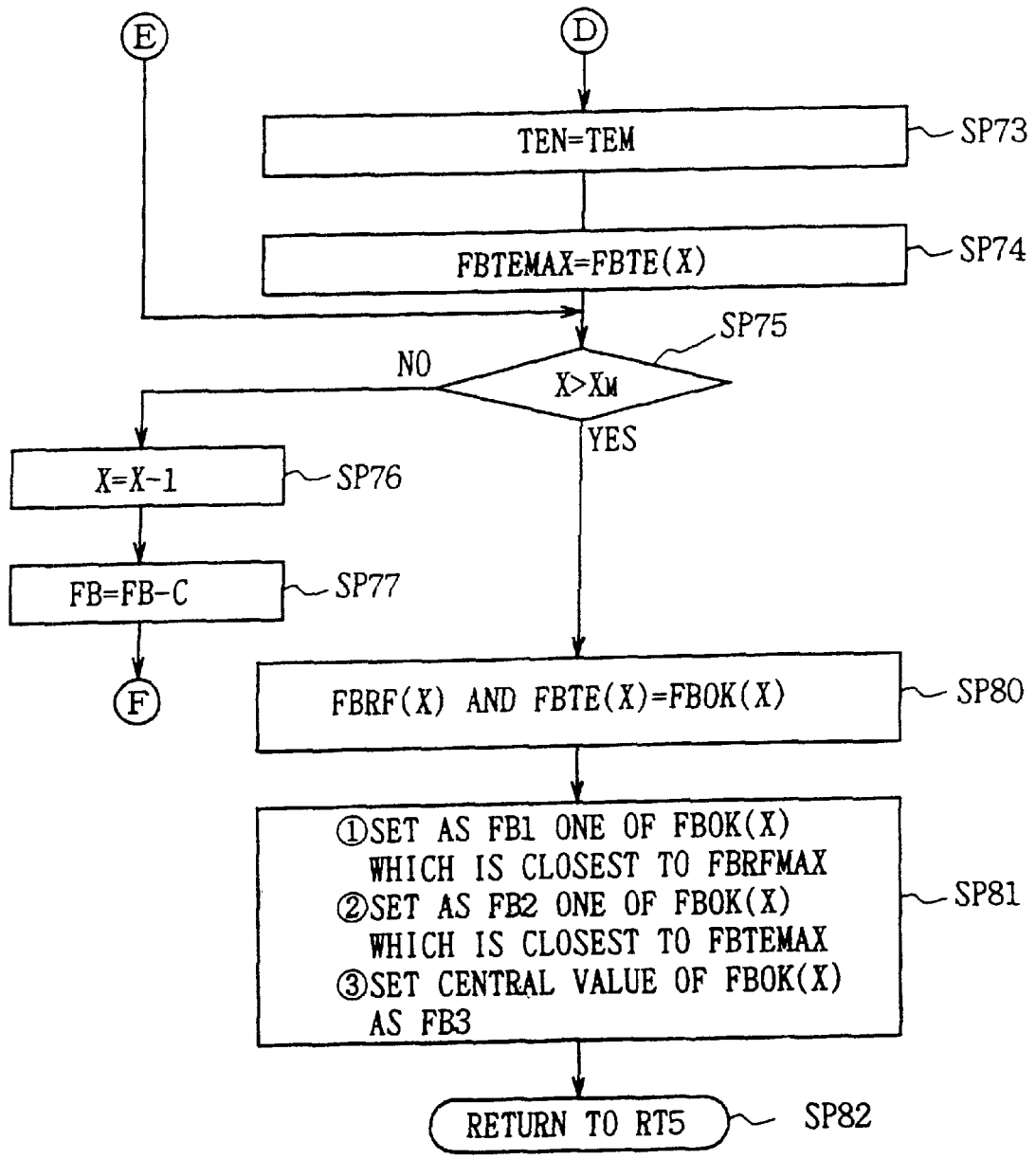
FIG. 16 is a flowchart showing the subroutine RT4 for the second focus bias value adjustment in FIG. 9.

When the result is negative in step SP34 of the subroutine RT3 for the first focus bias value adjustment and the CPU 15 thus returns to the subroutine RT4 from step SP37, the CPU 15 enters a second focus bias value adjustment in FIGS. 14 to 16. In step SP40, the CPU 15 first sets as the focus bias value a default focus bias value FBD representing an optimal focus bias value when the currently mounted disc 4 has a low recording density.

The CPU 15 also sets at zero a loop count value X representing the number of loop operations within the processing routine RT4. It proceeds to the next step SP41 to turn on the focusing servo loop, the tracking servo loop, and the spindle servo loop.

In the subsequent step SP42, the CPU 15 uses the RF signal amplitude detecting circuit 55 to detect the amplitude of the RF signal RF obtained from the RF signal forming circuit 13C in the matrix circuit 13, and stores the results of the detection in the RAM 17 as the RF signal amplitude value RFN via the analog digital converting circuit 56 and the bus 14. In the subsequent step SP43, the CPU 15 determines whether or not the stored RF signal amplitude value RFN exceeds a threshold A1.

A positive result in this step means that the currently set focus bias value FB (=FBD) is appropriate for the recorded information to be read from the currently mounted low density disc 4. The CPU 15 then proceeds to step SP44 to store the currently set focus bias value FB in the RAM 17 as a focus bias value FBRF (X) that is effective when the number of loop operations is X.

The CPU 15 then passes to step SP45 to determine whether or not the RF signal amplitude value RFN stored in step SP42 is larger than a maximum RF signal amplitude value RFN stored in the RAM 17, and if so, passes to step SP46 to store the RF signal amplitude value larger than the maximum RF signal amplitude value RFM in the RAM 17 as a new maximum RF signal amplitude value RFM. The CPU 15 subsequently stores the effective focus bias value FBRF(X) stored in step SP44, in the RAM 17 as a maximum RF focus bias value in step SP47.

In the determination in step SP45, the initial maximum RF signal amplitude value is assumed to be zero.

In this manner, the CPU 15 leaves in the RAM 17 a maximum RF focus bias value FBRFMAX that results in the maximum RF signal amplitude when the tracking servo loop is turned on and when the number of loop operations is X.

In the next step SP48, the CPU 15 turns the tracking servo off with the focusing servo turned on. It then stores as a detected tracking error signal value TEN the amplitude of the tracking error signal TE obtained from the tracking error signal forming circuit 13B in the matrix circuit 13 in step SP49. It then determines in step SP50 whether or not the detected tracking error signal value TEN is larger than a threshold A2.

A positive result in this step means that the current focus bias value is valid. The CPU 15 then proceeds to step SP51 to store the current focus bias value FB in the RAM 17 as the effective focus bias value FBTE (X), and determines in step SP52 whether or not the detected tracking error signal value TEN is larger than a maximum tracking error signal amplitude value TEM.

A positive result in this step means that the amplitude value of the currently detected tracking error signal TE has the maximum value. The CPU 15 then stores the amplitude value of the currently detected tracking error signal TE in the RAM 17 as the maximum tracking error signal amplitude value TEM in step SP53, and also stores the effective focus bias value FBTE (X) stored in step SP51, in the RAM 17 as a maximum tracking error focus bias value FBTEMAX.

In the determination in step SP52, the maximum tracking error signal amplitude value TEM is initially set at zero.

The CPU 15 thus loads the maximum tracking error signal value in the RAM 17 whenever the tracking servo loop is turned off.

The CPU 15 subsequently passes to step SP55 to confirm that the number of loop operations X is smaller than a maximum number of loop operations Xm, and increments this number by 1 in step SP56. It then sets a new focus bias value FB by adding a constant value C to it in step SP57, and then returns to the above step SP41. It then repeats the same loop operation processing for the number of loop operations X+1.

While in step SP57, the number of loop operations X is sequentially incremented by the constant value C until it reaches its maximum value Xm, the CPU 15 stores in the RAM 17 the focus bias values FBRF(X) and FBTE (X) that are effective when tracking is turned on and when t is turned off, respectively, in steps SP44 and SP51, and also stores in the RAM 17 the maximum RF signal amplitude value RFM and the maximum tracking error signal amplitude value TEM which are obtained when the tracking is turned on and when it is turned off, respectively, in steps SP46 and SP53.

That is, by repeating the loop operation processing from step SP40 to SP57, the group of effective focus bias values FBRF (X) and FBTE (X) obtained from the respective loop operations are stored in the RAM 17, and within the group of effective focus bias values, the RF and the tracking error signal amplitude values obtained when the RF signal RF and tracking error signal TE have maximum values are left in the RAM 17 as the maximum RF signal amplitude value RFM and the maximum tracking error signal amplitude value TEM, respectively.

In the above loop operations, a negative result in steps SP43 to SP50 means that the detected RF signal value RFN and the detected tracking error signal value TEN which are detected in steps SP42 and SP49, respectively, are invalid. In this case, the CPU 15 skips the processing in steps SP44 to SP47 and SP51 to SP54, and proceeds to steps SP48 and SP55 from steps SP43 and SP50, respectively.

A negative result in steps SP45 and SP52 means both the detected RF signal amplitude value RFN and the detected tracking error signal amplitude value TEN which are obtained when the effective focus bias values FBRF (X) and FBTE (X) are not the maximum value. In this case, the CPU 15 passes to steps SP48 and SP55 without executing the processing in steps SP46 and SP47, and SP53 and SP54, respectively.

In the loop operation processing in steps SP41 to SP57, the CPU 15 sequentially increments the focus bias value FB by the constant value C, while in the loop operation processing in steps SP60 and subsequent steps, it sequentially decrements this value by the constant value C each time a single loop operation is performed.

That is, in steps SP60 to SP67, the CPU 15 stores in the RAM 17 the group of effective focus bias values FBRF (X) and the maximum RF signal amplitude value RFM and the maximum RF focus bias value FBRFMAX, as described in the above steps SP40 to SP47.

In steps SP68 to SP74, the CPU 15 stores the group of effective focus bias values FBTE (X) obtained when the tracking servo is turned off and when the focusing servo is turned on, as well as the maximum tracking error signal amplitude value TEM, as described in the above steps SP48 to SP54.

After finishing this processing, the CPU 15 passes to step SP80 to determine a group of comprehensive effective detected focus bias values FBOK (X) assuming that the groups of effective focus bias values FBRF (X) and FBTE (X) obtained in steps SP44 and SP51, and SP64 and SP71, respectively, are within effective ranges above the thresholds A1 and A2, respectively.

The CPU 15 subsequently proceeds to step SP81 to determine optimal focus bias values FBI, FB2, and FB3 based on three determination criteria.

A first determination criterion is that the CPU 15 determines as a first optimal focus bias value FB1 one of the comprehensive effective detected focus bias values FBOK (X) which is closest to the maximum detected RF focus bias value FBRF.

A second determination criterion is that the CPU 15 determines as a second optimal focus bias value FB2 one of the comprehensive effective detected focus bias values FBOK (X) which is closest to the maximum detected tracking error focus bias value FBTEMAX.

A third determination criterion is that the CPU 15 determines as a third optimal focus bias value FB3 the central value of the comprehensive effective detected focus bias values FBOK(X).

The second focus bias value adjustment ends when the first, second, and third optimal focus bias values FB1, FB2, and FB3 are determined in the above manner, and the CPU 15 then and returns to the subroutine RT5 of the main routine (FIG. 9) from step SP82.

When a low recording density disc is mounted as the disc 4, by executing the second focus bias value adjustment in FIGS. 14 to 16, the CPU 15 increments the focus bias value by the constant value C to determine the range of effective focus bias values within which the RF signal can have a sufficient magnitude to be detected when the tracking servo loop is turned on or off and within which the amplitude of the tracking error signal can also have a sufficient magnitude to be detected. It then determines the optimal focus bias values FB1, FB2, and FB3 from the group of effective focus bias values. The CPU 15 can thus reliably set a focus bias value that enables the obtention of the RF and the tracking error signals of sufficient amplitudes to reproduce the information recorded on the in currently mounted low recording density disc 4.

(2-5) Selecting an RF Signal (RT5)

In the subroutine for selecting an RF signal (RT5), the CPU 5 determines whether the switching circuit 40 is to be set to the switching input end A or B by determining whether the data DATA1 demodulated by the RF signal modulating circuit 39 or the reproduced data DATA2 demodulated by the RF signal demodulating circuit 46 is optimal in terms of the error rate, the modulation degree, and the asymmetry value.

Figure 17:
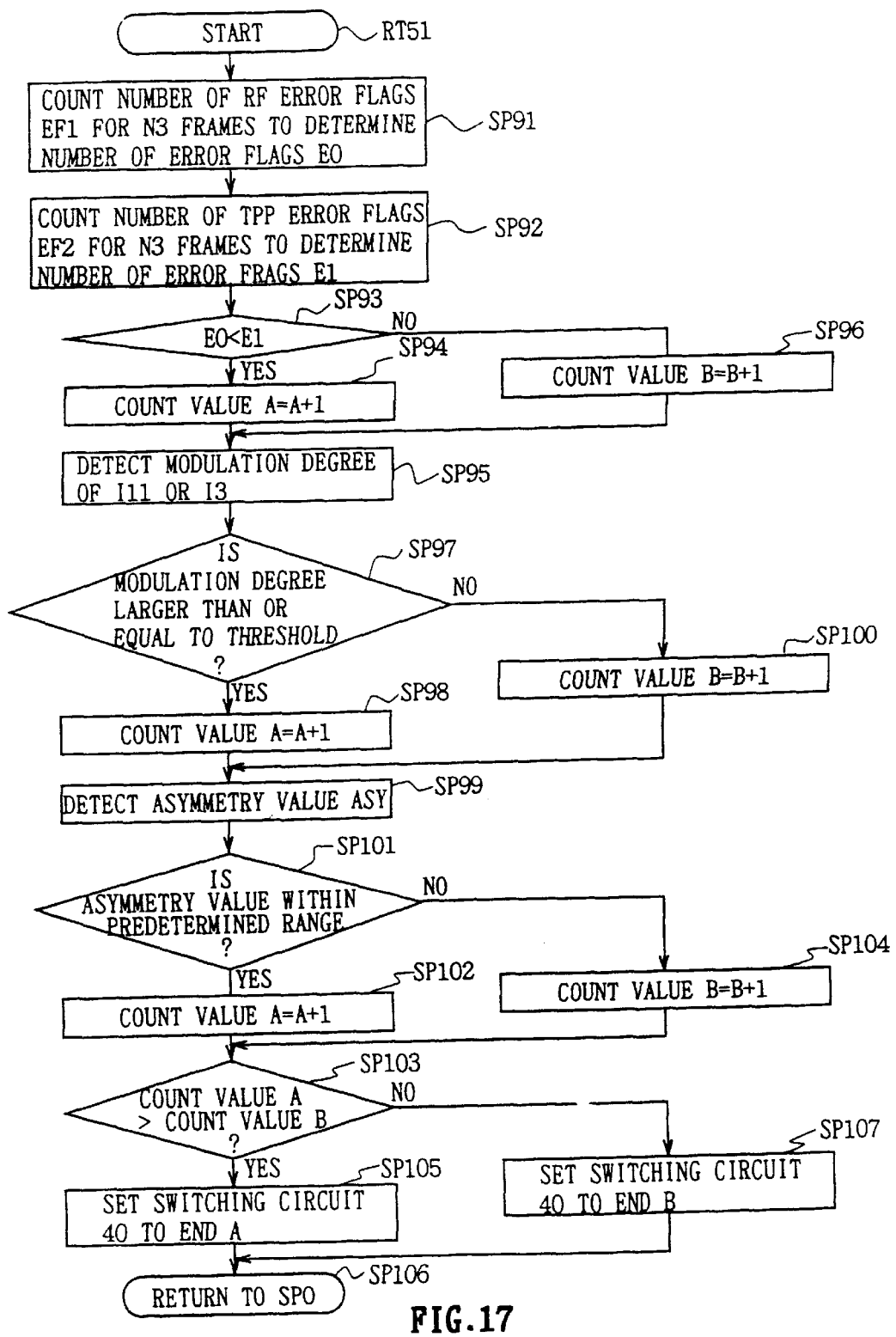
FIG. 17 is a flowchart showing a subroutine for a first selecting method which is included in a subroutine RT5 for selecting an RF signal in FIG. 9.

Upon entering the procedure RT5 for selecting an RF signal, the CPU 15 first executes a first selecting processing routine RT 51 (FIG. 17).

In step SP91 in which the integral detection method is used to reproduce the reproduced data DATA1, the CPU 15 counts for N3 frames error flag signals EF1 detected by the RF signal demodulating circuit 39 on a frame basis to obtain the number of error flags E0.

The CPU 15 subsequently proceeds to step SP92 in which the differential detection method is used to reproduce the reproduced data DATA2, the CPU 15 counts for N3 frames error flag signals EF2 detected by the RF signal demodulating circuit 46 on a frame basis to obtain the number of error flags E1.

In the next step SP93, the CPU 15 determines whether or not the number of error flags E0 is smaller than the number of error flags E1.

A positive result in this step means that a smaller number of error flags can be obtained from the currently mounted disc 4 by using the integral detecting method to demodulate the reproduced data DATA1. The CPU 15 then passes to step SP94 to add 1 to an A count value A (initially set to zero), and then proceeds to step SP95.

A negative result in step SP93, however, means that for the currently mounted disc 4, a smaller number of error flags can be obtained when the reproduced data DATA2 is demodulated by the differential detection method. The CPU 15 then passes to step SP96 to add 1 to an B count value B (initially set to zero), and then proceeds to step SP95.

In this manner, the CPU 15 determines in terms of the characteristics of the error rate whether the integral or the differential detection method is optimal, and stores the count value A or B plus 1 as the result of determination.

As shown in FIG. 18(A), when the currently mounted disc 4 has data recorded in pits P1 of a width W1 required for low recording density whereas the optical pickup 5 uses a laser beam of a small wave length to form a light spot 12 of a small diameter, the RF signal obtained by the RF signal forming circuit 13C in the matrix circuit 13 using the integral detection method is subjected to changes in its level as shown by the solid and the broken lines in FIG. 18(B) only when the light spot L2 enters and leaves the pit P1.

Figure 3A:
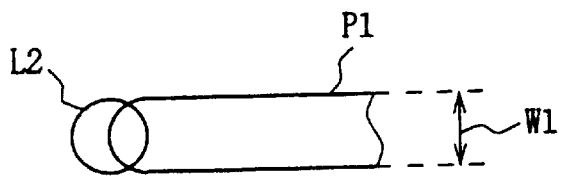
FIGS. 3(A) and 3(B) are a schematic diagram and a signal waveform chart, respectively, describing problems occurring when a light spot formed by a laser beam of a small wave length reproduces pits with information sparsely recorded therein.
Figure 3B:
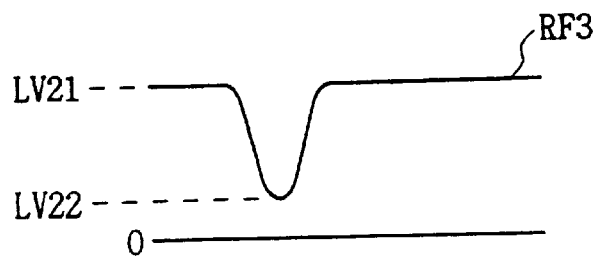

Consequently, the recorded information cannot be reproduced using the integral detection as described above in FIG. 3(B). In FIG. 18(A), however, the tangential push-pull signal is as shown in FIG. 18(C), and differentiating this signal results in the signal shown in FIG. 18(D). The edge position of the pit can be detected from the signal in FIG. 18(D), so the recorded information can be reproduced.

Figure 1A:
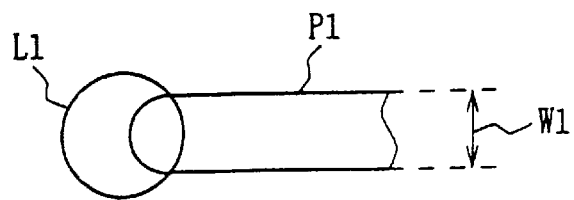
FIGS. 1(A) and 1(B) are a schematic diagram and a signal waveform chart, respectively, describing the case in which a light spot formed by a laser beam of a large wave length reproduces pits with information sparsely recorded therein.
Figure 1B:
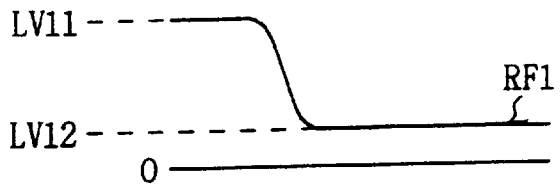

That is, even if the adjustment of the focus bias value is insufficient for the reproduction of a low recording density recording medium and the condition shown in FIG. 1(A) cannot be achieved, the recorded information can be reproduced by switching to the differential detection.

Next, in step SP95, the CPU 15 detects the modulation degree of data 11T or 3T according to Equations (1) and (2) described above, using the detection outputs M (11T and 3T) obtained by the asymmetry modulation degree detecting circuit 58 and based on the RF signal RF obtained by the RF signal forming circuit 13C in the matrix circuit 13, and in the next step SP97, determines whether or not the demodulation degree is higher than or equal to the threshold.

A positive result in this step means that the focus bias value can be adjusted accurately whether the disc has a high or a low recording density and that the integral detection enables the data to be substantially sufficiently reproduced. The CPU 15 then proceeds to step SP98 to add 1 to the A count value A, and then passes to step SP99.

A negative result in step SP97, however, means that the focus bias value cannot be reliably adjusted whether the disc has a high or a low recording density and that the integral detection does not enable the data to be substantially sufficiently reproduced.

The CPU 15 then proceeds to step SP100 to add 1 to the B count value, and then passes to step SP99.

In this manner, the CPU 15 determines in terms of the characteristics of the demodulation degree whether the integral or the differential detection method is optimal, and stores the count value A or B plus 1 as the results of determination.

In step SP99, the CPU 15 detects the asymmetry value ASY for the land and the pit according to Equation (3), using the detection output ASY obtained by the asymmetry demodulation degree detecting circuit 58 and based on the RF signal RF obtained by the RF signal forming circuit 13C in the matrix circuit 13, and in the next step SP101, determines whether the asymmetry value ASY is within a predetermined range.

A positive result in this step means that the asymmetry of the land and the pit has a sufficient value for the data to be reproduced. The CPU 15 then proceeds to step SP102 to add 1 to the count value A, and then passes to step SP103.

A negative result in step SP101, however, means that the results of the integral detection do not provide a symmetry required to reproduce good data whether the disc has a high or a low recording density. The CPU 15 then proceeds to step SP104 to add 1 to the count value B, and then passes to step SP103.

In this manner, the CPU 15 determines in terms of the asymmetry of the land and the pit whether the integral or the differential detection method is optimal, and stores the count value A or B plus 1 as the results of determination.

Next, in step SP103, the CPU 15 determines whether or not the count value A is larger than the count value B. If the result is positive, the CPU 15 determines that the integral detecting method is optimal, sets the switching circuit 40 to the switching input end A in step SP105, and then returns to step SP0 from step SP106.

A negative result in step SP103, however, means that the differential detecting method is optimal. The CPU 15 then sets the switching circuit 40 to the switching input end B in step SF107, and then returns to step SP0 from step SP106.

According to a method 1 in the subroutine RT51 for selecting an RF signal in FIG. 17, by executing the processing in steps SP91 to 93, SP95 and SP97, and SP99 and SP101, the CPU 15 can store as the cumulative results of the count A or B, respective optimal detection methods in terms of the number of error flags, modulation degree, and asymmetry value for the land and the pit for the reproduced data obtained by the integral and the differential detecting methods, thereby reliably selecting a comprehensively optimal detection method.

Only a part of the selecting processing routine RT51 (FIG. 17) can be carried out to process the procedure RT5 for selecting an RF signal.

Figure 19:
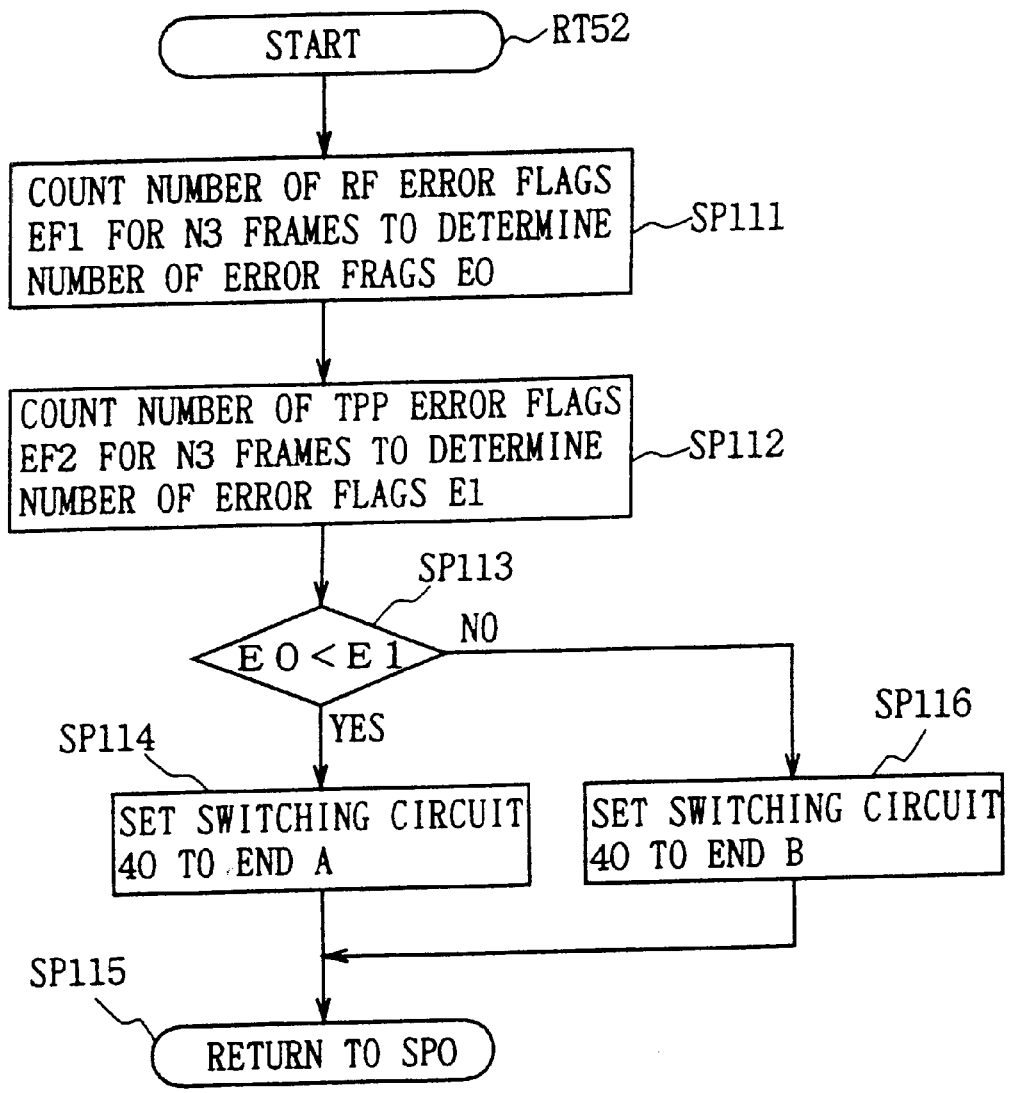
FIG. 19 is a flowchart showing a subroutine RT52 for a third selecting method which is included in the subroutine RT5 for selecting an RF signal in FIG. 9.

That is, as a second method for processing the selecting procedure RT5, the CPU 15 enters the selecting processing routine RT52, and in steps SP111 to SP113, executes the same processing as in steps SP91 to SP93 of the processing procedure in FIG. 17, as shown in FIG. 19.

When determining from a positive result in step SP113 that a smaller number of error flags can be obtained from the currently mounted disc 4 by using the integral detecting method to reproduce the reproduced data, the CPU 15 sets the switching circuit 40 to the switching input end A in step SP114, and then returns to step SP0 (FIG. 9) from step SP115.

Conversely, when determining from a negative result in step SP113 that a smaller number of error flags can be obtained from the currently mounted disc 4 by using the differential detecting method to reproduce the reproduced data, the CPU 15 sets the switching circuit 40 to the switching input end B in step SP116, and then returns to step SP0 (FIG. 9) from step SP15.

The second method comprising the selecting processing subroutine RT52 in FIG. 19 serves to implement an optical recording medium reproducing apparatus that select either the use of the integral detecting method to reproduce the reproduced data DATA1 or the use of the differential detecting method to reproduce the reproduced data DATA2 so as to reduce the number of error flags.

Next, as a third method for processing the selecting procedure RT5, the CPU 15 enters the selecting processing routine RT53, and in steps SP121 and SP122, executes the same processing as in steps SP95 and SP97 of the processing procedure in FIG. 17, as shown in FIG. 20.

When determining from a positive result in step SP122 that an RF signal with a sufficient modulation degree can be obtained from the currently mounted disc 4 by using the integral detecting method to reproduce the reproduced data, the CPU 15 sets the switching circuit 40 to the switching input end A in step SP123, and then returns to step SP0 (FIG. 9) from step SP124.

Conversely, when determining from a negative result in step SP122 that an RF signal with a sufficient modulation degree can be obtained from the currently mounted disc 4 by using the differential detecting method to reproduce the reproduced data, the CPU 15 sets the switching circuit 40 to the switching input end B in step SP125, and then returns to step SP0 (FIG. 9) from step SP124.

In this manner, based on whether or not the pits of the currently mounted disc 4 can be detected at a sufficient modulation degree, the third method comprising the selecting processing subroutine RT53 in FIG. 20 enables the recorded data to be substantially sufficiently reproduced by using the integral detecting method to reproduce the reproduced data DATA1 if the pits can be detected at a sufficient modulation degree and otherwise using the differential detecting method. If the pit cannot be detected with a sufficient modulation degree, the recorded data can be substantially sufficiently reproduced by using the differential detecting method.

Figure 21:
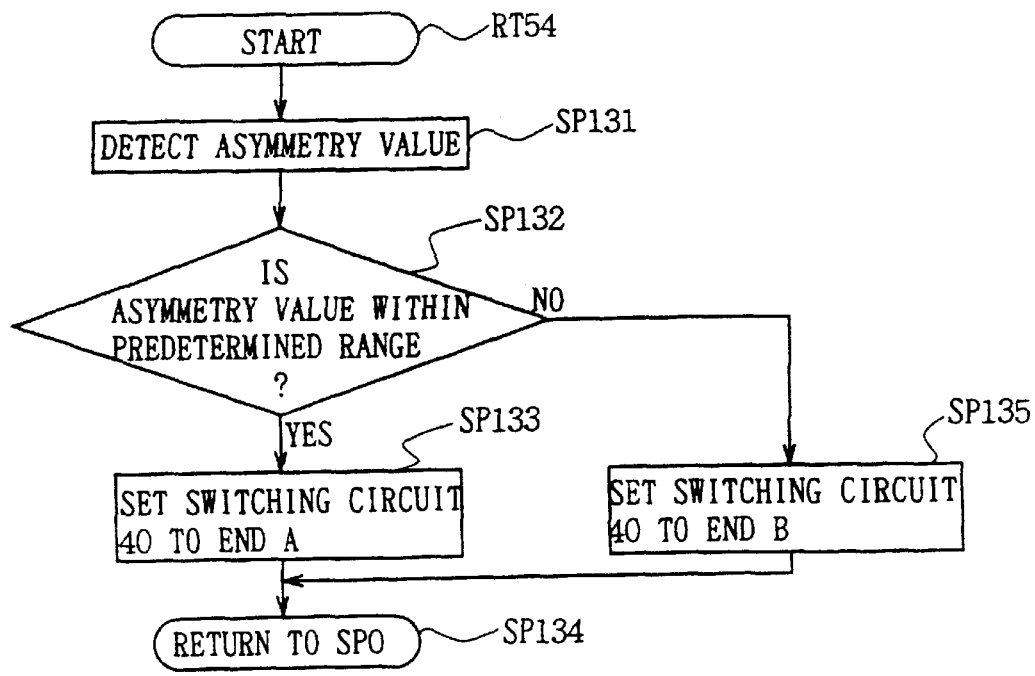
FIG. 21 is a flowchart showing a subroutine RT54 for a fourth selecting method which is included in the subroutine RT5 for selecting an RF signal in FIG. 9.

Next, as a fourth method for processing the selecting procedure RT5, the CPU 15 enters the selecting processing routine RT54, and in steps SP131 and SP132, executes the same processing as in steps SP99 and SP101 of the processing procedure in FIG. 17, as shown in FIG. 21.

When determining from a positive result in step SP132 that an RF signal with a sufficient asymmetry value can be obtained from the currently mounted disc 4 by using the integral detecting method to reproduce the reproduced data, the CPU 15 sets the switching circuit 40 to the switching input end A in step SP133, and then returns to step SP0 (FIG. 9) from step SP134.

Conversely, when determining from a negative result in step SP132 that an RF signal with a sufficient asymmetry value can be obtained from the currently mounted disc 4 by using the differential detecting method to reproduce the reproduced data, the CPU 15 sets the switching circuit 40 to the switching input end B in step SP135, and then returns to step SP0 (FIG. 9) from step SP134.

In this manner, the fourth method comprising the selecting processing routine RT54 in FIG. 21 selects either the data obtained by the integral detecting method or the data obtained by the differential detecting method based on whether or not the asymmetry value ASY is appropriate.

(2-6) Summary of Calibration Processing

As described above, the CPU 15 carries out the calibration processing procedure RT0 in FIG. 9 and ends it when the number of error flags obtained is smaller than the threshold if in the subroutine RT1 for inputting a default focus bias value, the CPU sets as the initial value an optimal default focus bias value for a light spot of a small wave length required for a high recording density, because in this case, the currently mounted disc 4 has a high recording density.

If, however, the number of error flags is larger than or equal to the threshold when the default focus bias value is initialized, the CPU 15 determines that the mounted disc 4 has a low recording density, and executes the routine RT2 for determining the tracking polarity (FIG. 11). This allows the polarity of the tracking error signal obtained from the currently mounted disc 4 to be set so as to reduce the number of errors. This in turn enables reproducing conditions to be set so as to adequately control tracking according to the characteristics of the mounted disc 4.

Under these conditions, the CPU 15 carries out the subroutine RT3 for adjusting the focus bias value (FIG. 12) to determine whether the mounted disc 4 includes the absolute time in the pregroove (ATIP) information. If so, the CPU 15 sets an optimal focus bias value for the disc with a pregroove.

As a result, if a disc with a pregroove is mounted as the disc 4, the focus bias value can be set so as to obtain a light spot of a diameter compatible with this disc.

If, however, a disc without a pregroove is mounted as the disc 4, the CPU 15 executes the second subroutine RT4 for adjusting the focus bias value (FIGS. 14 to 16) in order to set the focus bias value so as to obtain a light spot diameter required to reproduce the mounted low recording density disc 4 with a light spot formed by a laser beam of a small wave length.

The CPU 15 can thus set an optimal light spot diameter for the pit width of a low recording density disc if such a disc is mounted.

Furthermore, the CPU 15 executes the selecting processing subroutine RT5 (FIGS. 17 to 21) to set reproducing conditions in which the reproduced data obtained by the differential detecting method is used if the reproduced data obtained by the integral detecting method does not provide higher performance than the reproduced data DATA2 obtained by the differential detecting method in terms of the number of error flags, the modulation degree of the data, and the asymmetry value for the land and the pit.

Therefore, this apparatus can execute calibration so as to automatically set reproducing conditions in which practically sufficiently appropriate reproduced data can be obtained not only when high recording density discs are mounted but also when low recording density discs are loaded as the disc 4

(3) Reproducing Recorded Information

The CPU 15 carries out the calibration processing in FIG. 9 to optimize the reproducing conditions of the optical recording medium reproducing apparatus 1 according to the type of the mounted disc 4. When reproduction is requested by using an operation input key 70, the CPU 15 executes the reproducing procedure RT10 shown in FIG. 22 to reproduce the information recorded on the mounted disc 4.

Upon entering the reproducing procedure RT10, the CPU 15 reads the address that the optical pickup 5 is accessing in step SP151, and determines in step SP152 whether or not a track jump is required.

Here, obtaining a negative result means the optical pickup 5 is accessing the target address.

The CPU 15 then determines that a seek operation has been finished, proceeds to step SP153 to read the information recorded on the mounted disc 4, and then passes to step SP154 to end the reproducing procedure RT10.

A positive result in step SP152, however, means that a track jump is required.

In this case, the CPU 15 proceeds to step SP155 to provide the phase control signal S2 to the phase compensating circuit 29 in the tracking servo loop in order to instruct the circuit to initiate a track jump. It determines in step SP156 whether the apparatus is in a mode that allows the switching of the reproducing conditions.

The optical recording medium reproducing apparatus 1 can select either a switching mode that allows the focus bias value to be switched depending upon whether a read or a track jump is required or a fixed mode that does not allow the switching of the focus bias value.

A positive result in step SP156 means that the apparatus is in the switching mode. The CPU 15 then passes to step SP157 to set as the focus bias value FB the optimal focus bias value FB2 determined as the second determined condition in step SP81 of the subroutine RT4 for the second focus bias value adjustment (FIGS. 14 to 16). It then provides this value to the summing circuit 21. This enables the diameter of the light spot of the optical pickup 5 to be increased to obtain a tracking error signal TE with the largest amplitude from the mounted disc 4, resulting in practically sufficient tracking operations. After finishing the setting of the focus bias value in step SP157, the CPU 15 passes to step SP158 to wait for the track jump to end.

A negative result in step SP156, however, means that the apparatus is in the fixed mode. The CPU 15 then proceeds to step SP158 to wait for the track jump to end.

Once the track jump of the optical pickup 5 has been finished, the CPU 15 proceeds to step SP159 to determine whether the apparatus is in the switching mode. If the result is positive, the CPU 15 sets as the focus bias value FB the optimal focus bias value FB1 determined as the first determined condition in step SP81 of the subroutine RT4 for the second focus bias value adjustment in step SP160, and then reads the address in step SP161. The CPU 15 passes to step SP162 to determine whether the target address has been reached.

Since the focus bias value has been set to the focus bias value FB1 in step SP160, the light spot of the optical pickup 5 is set so that the RF signal will have the largest amplitude. This ensures that the address can be read in step SP161.

In step SP161, when a disc used only for reproduction is mounted as the disc 4, the CPU 15 can read the address from the reproduced data DATA1 reproduced by the RP signal demodulating circuit 39. In addition, when a write once disc with a pregroove (a CD-R) is mounted as the disc 4, it can read the address from the absolute time in the pregroove ATIP data obtained by the absolute time in the pregroove (ATIP) data modulating circuit 60.

A negative result in step SP159, however, means that the apparatus is in the fixed mode. In this case, instead of setting the focus bias value FB in step SP160, the CPU 15 skips this step and passes to step SP162.

In step SP162, when determining that the target address has not been reached yet, the CPU 15 returns to the above step SP155.

If, however, the result is positive in step SP162, the CPU 15 determines that a seek operation has been finished, and executes the read operation in the above step SP153. The CPU 15 then ends the reproducing procedure in step SP154.

Figure 22:
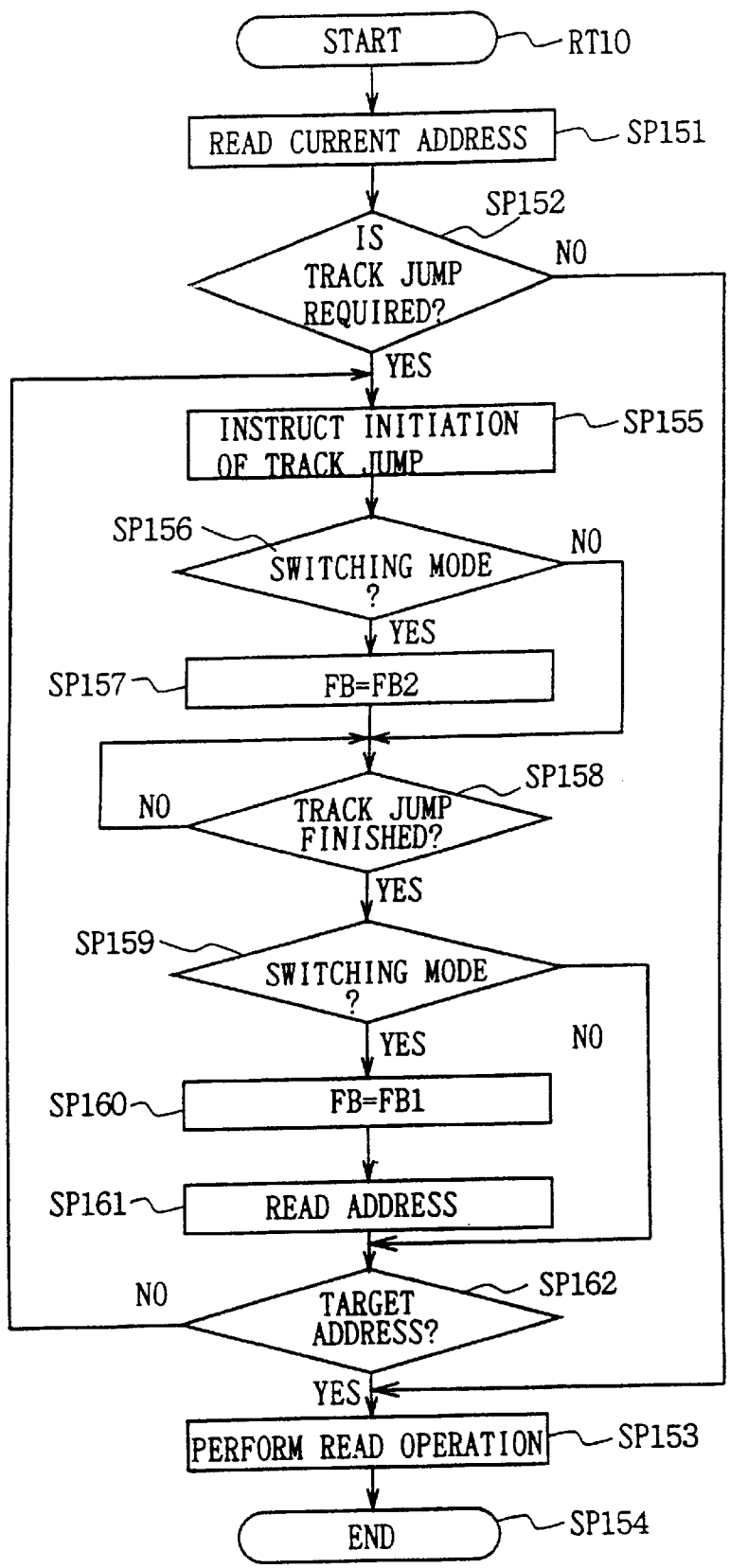
FIG. 22 is a flowchart showing a reproducing procedure.

Since the reproducing procedure RT10 in FIG. 22 sets different optimal focus bias values depending upon whether a track jump or reproduction is to be executed out based on the reproducing conditions set by the calibration procedure RT0 (FIG. 9), both track jump operations and reproduction can be reliably carried out whether the disc has a high or a low recording density. For high recording density discs, the reproducing procedure in FIG. 22 can be coped with by storing the default focus bias value DFH for reproduction set in step SP1, in the ROM 16 as FB1 beforehand and also storing a focus bias value for a track jump in the ROM 16 as FB2 beforehand.

(4) Other Embodiments (4-1) Although the above embodiments have been described in conjunction with the application of a compact disc as the disc 4 that is an optical recording medium, this invention is not limited to this aspect, but may be widely applicable to various media from which the optical pickup can read the recorded information.

(4-2) Although the above embodiments have been described in conjunction with the use of a compact disc as the optical recording medium 1, this invention is not limited to this aspect, but may be widely applicable to those discs which the optical pickup can reproduce.

Industrial Applicability

The optical recording medium reproducing apparatus according to this invention can be used as an optical disc reproducing apparatus.

The optical recording medium reproducing apparatus according to this invention can also be used as a reproducing apparatus for optical recording media shaped like rectangles instead of discs and in which a plurality of recording tracks are formed so as to be horizontally aligned.

The reference numerals used on the attached Figures refer to the following elements: 1 . . . optical recording medium reproducing apparatus, 3 . . . spindle motor, 4 . . . disc, 5 . . . optical pickup, 6 . . . laser diode, 8 . . . beam splitter, 9 . . . objective lens, 10 . . . lenticular lens, 11 . . . quarterly dividing detector, 12A to 12D . . . amplifing circuit, 13 . . . matrix circuit, 13A . . . focusing error signal forming circuit, 13B . . . tracking error signal forming circuit, 13C . . . RF signal forming circuit, 13D . . . tangential push-pull signal forming circuit, 13E . . . push-pull signal forming circuit, 21 . . . summing circuit, 22, 29, 32, 50 . . . phase compensating circuit, 23, 30, 33, 51 drive circuit, 14 . . . bus, 15 . . . CPU, 16 . . . preset ROM, 17 RAM, 24 . . . focusing actuator, 27 . . . switching circuit, 28 divider, 31 . . . tracking actuator, 34 . . . thread actuator, 35 . . . tracking error signal amplitude detecting circuit, 40 . . . switching circuit, 41 . . . spindle servo, 38 ... AGC circuit, 39, 46 ... RF signal demodulating circuit, 45 tangential push-pull signal processing circuit, 55 ... RF signal amplitude detecting circuit, 58 ... asymmetry modulation degree detecting circuit, 60 ... absolute time data in the pregroove demodulating circuit, 70 ... operation input key.

What is claimed is:

1. An optical recording medium reproducing apparatus for reproducing information recorded on an optical recording medium with a plurality of pits formed along recording tracks based on said recorded information, comprising:
    a laser beam emitting means for emitting a laser beam;
    a focus control means for controlling the focusing of said laser beam on said optical recording medium; and
    a control means for controlling said focus control means so as to increase the spot diameter of the laser beam emitted onto said optical recording medium when the medium has a low recording density with pits relatively sparsely arranged compared to the case in which the medium has a high recording density with pits relatively densely arranged;
    a light receiving means for receiving a laser beam reflected from said optical recording medium;
    a servo error signal generating means for generating a servo error signal based on an output signal from the light receiving means;
    a polarity detecting means for detecting the polarity of said servo error signal; and
    a polarity selecting means for selecting the polarity of said servo error signal based on an output signal from said polarity detecting means,
    wherein said light receiving means includes at least one quarterly dividing detector with four detecting means and at least two half dividing detectors each with two detecting means.

2. An optical recording medium reproducing apparatus according to claim 1 wherein said said polarity detecting means includes:
    information data generating means for generating the information data demodulated by a predetermined method and recorded along said tracks un said optical recording medium based on an output signal from the light receiving means; and
    a polarity determining means for determining the polarity of said servo error signal depending upon whether said information data can be generated correctly by said information data generating means.

3. An optical recording medium reproducing apparatus according to claim 1 wherein
    said servo error signal is a tracking error signal.

4. An optical recording medium reproducing apparatus for reproducing information recorded on an optical recording medium with a plurality of pits formed along recording tracks based on said recorded information, comprising:
    a laser beams emitting means for emitting a laser beam;
    a focus control means for controlling the focusing of said laser beam on said optical recording medium;
    a control means for controlling said focus control means so as to increase the spot diameter of the laser beam emitted onto said optical recording medium when the medium has a low recording density with pits relatively sparsely arranged compared to the case in which the medium has a high recording density with pits relatively densely arranged;
    a light receiving means for receiving a laser beam reflected from said optical recording medium;
    a read signal generating means for generating a read signal for said recorded information based on an output signal from said light receiving means;
    a tangential push-pull signal generating means for generating a tangential push-pull signal based on an output signal from said light receiving means;
    an error detecting means for detecting the error condition of the output signal from said light receiving means; and
    a selecting means for selectively outputting said read signal and said tangential push-pull signal wherein:
        said control means controls said selecting means based on an output signal from said error detecting means.

5. An optical recording medium reproducing apparatus according to claim 4 wherein
    said error detecting means detects the error condition of said read signal, and wherein:
        said control means controls said selecting means in such a way that it outputs said tangential push-pull signal instead of said read signal when said error detecting means determines that said read signal is an error.

6. An optical recording medium reproducing apparatus according to claim 4 further comprising:
    a modulation degree detecting means for detecting the modulation degree based on the output signal from said light receiving means, wherein:
        said error detecting means detects whether or not said modulation degree is larger than or equal to a predetermined value, and wherein:
        said control means controls said selecting means in such a way that it outputs said tangential push-pull signal instead of said read signal when said modulation degree detecting means determines that the modulation degree is below the predetermined value.

7. An optical recording medium reproducing apparatus according to claim 4 further comprising:
    an asymmetry value detecting means for detecting an asymmetry value based on the output signal from said light receiving means, wherein:
        said error detecting means detects whether or not said asymmetry value is within a predetermined range, and wherein:
        said control means controls said selecting means in such a way that it outputs said tangential push-pull signal instead of said read signal when said asymmetry value falls out of said predetermined range.

8. An optical recording medium reproducing apparatus for reproducing information recorded on an optical recording medium with a plurality of pits formed along recording tracks based on said recorded information, comprising:
    a laser beams emitting means for emitting a laser beam;
    a focus control means for controlling the focusing of said laser beam on said optical recording medium;
    a control means for controlling said focus control means so as to increase the spot diameter of the laser beam emitted onto said optical recording medium when the medium has a low recording density with pits relatively sparsely arranged compared to the case in which the medium has a high recording density with pits relatively densely arranged;
    a light receiving means for receiving a laser beam reflected from said optical recording medium;
    an integral detection means for processing integral detection to said recorded information based on an output signal from said light receiving means;

a differential detection means for processing differential detection to said recorded information based on an output signal from said light receiving means;

an error detecting means for detecting the error condition of the output signal from said light receiving means; and a selecting means for selectively outputting an output signal from said integral detection means and an output signal from said differential detection means, wherein:

said control means controls said selecting means based on an output signal from said error detecting means.

9. An optical recording medium reproducing apparatus according to claim 8 wherein said error detecting means detects the error condition of a read signal, and wherein:

said control means controls said selecting means in such a way that it outputs the output signal from said differential detection means instead of the output signal from said integral detection means when said error detecting means determines that said read signal is an error.

10. An optical recording medium reproducing apparatus according to claim 1 further comprising:

a modulation degree detecting means for detecting the modulation degree based on the output signal from said light receiving means, wherein:

said error detecting means detects the error condition of the output signal from said light receiving means depending upon whether or not said modulation degree is larger than or equal to a predetermined value, and wherein:

said control means controls said selecting means in such a way that it outputs the output signal from said differential detection means instead of the output signal from said integral detection means when said modulation degree detecting means detects that the modulation degree is below the predetermined value.

11. An optical recording medium reproducing apparatus according to claim 1 further comprising:

an asymmetry value detecting means for detecting an asymmetry value based on the output signal from said light receiving means, wherein:

said error detecting means detects the error condition of the output signal from said light receiving means depending upon whether or not said asymmetry value is within a predetermined range, and wherein:

said control means controls said selecting means in such a way that it outputs the output signal from said differential detection means instead of the output signal from said integral detection means when said asymmetry value is within said predetermined range.

* * * * *